(12) United States Patent  
Teraoka et al.

(10) Patent No.: US 11,108,083 B2  
(45) Date of Patent: Aug. 31, 2021

(54) ELECTRODE COMPOSITE BODY, METHOD OF MANUFACTURING ELECTRODE COMPOSITE BODY, AND LITHIUM BATTERY

(71) Applicant: SEIKO EPSON CORPORATION, Tokyo (JP)

(72) Inventors: Tsutomu Teraoka, Matsumoto (JP); Tomofumi Yokoyama, Matsumoto (JP); Hitoshi Yamamoto, Chino (JP)

(73) Assignee: SEIKO EPSON CORPORATION, Tokyo (JP)

( * ) Notice: Subject to any disclaimer, the term of this patent is extended or adjusted under 35 U.S.C. 154(b) by 63 days.

(21) Appl. No.: 16/654,692

(22) Filed: Oct. 16, 2019

(65) Prior Publication Data

US 2020/0052329 A1 Feb. 13, 2020

Related U.S. Application Data

(62) Division of application No. 15/161,833, filed on May 23, 2016, now abandoned.

(30) Foreign Application Priority Data

Jun. 8, 2015 (JP) .................................. 2015-115507

(51) Int. Cl.
*H01M 10/0562* (2010.01)
*H01M 10/0561* (2010.01)
(Continued)

(52) U.S. Cl.
CPC ....... *H01M 10/0562* (2013.01); *H01M 4/131* (2013.01); *H01M 10/052* (2013.01);
(Continued)

(58) Field of Classification Search
None
See application file for complete search history.

(56) References Cited

U.S. PATENT DOCUMENTS

2004/0096745 A1 5/2004 Shibano et al.
2011/0045355 A1 2/2011 Ichikawa
(Continued)

FOREIGN PATENT DOCUMENTS

EP 2 234 195 A1 9/2010
JP 2001-126758 A 5/2001
(Continued)

OTHER PUBLICATIONS

Sep. 16, 2020 Notice of Allowance issued in U.S. Appl. No. 16/654,631.
(Continued)

*Primary Examiner* — Yoshitoshi Takeuchi
(74) *Attorney, Agent, or Firm* — Oliff PLC

(57) ABSTRACT

An electrode composite body includes: an active material molded body including active material particles which include a lithium composite oxide and have a particle shape, and a communication hole that is provided between the active material particles; a first solid electrolyte layer that is provided on a surface of the active material molded body, and includes a first inorganic solid electrolyte; and a second solid electrolyte layer that is provided on the surface of the active material molded body, and includes a second inorganic solid electrolyte of which a composition is different from a composition of the first inorganic solid electrolyte, and which contains boron as a constituent element and is crystalline.

8 Claims, 9 Drawing Sheets

(51) Int. Cl.
- *H01M 10/056* (2010.01)
- *H01M 4/131* (2010.01)
- *H01M 4/1391* (2010.01)
- *H01M 10/058* (2010.01)
- *H01M 10/052* (2010.01)

(52) U.S. Cl.
CPC .. *H01M 10/058* (2013.01); *H01M 2300/0071* (2013.01); *H01M 2300/0094* (2013.01)

(56) References Cited

U.S. PATENT DOCUMENTS

| | | |
|---|---|---|
| 2011/0053002 A1 | 3/2011 | Yamamura et al. |
| 2012/0015234 A1 | 1/2012 | Iwaya et al. |
| 2014/0057181 A1 | 2/2014 | Lee et al. |
| 2014/0216631 A1 | 8/2014 | Teraoka et al. |
| 2014/0216632 A1 | 8/2014 | Ichikawa et al. |
| 2014/0220436 A1 | 8/2014 | Yokoyama et al. |
| 2014/0220454 A1 | 8/2014 | Furukawa et al. |
| 2015/0044575 A1 | 2/2015 | Kawaji et al. |
| 2015/0118573 A1 | 4/2015 | Yokoyama et al. |
| 2015/0221979 A1 | 8/2015 | Teraoka et al. |
| 2015/0228981 A1 | 8/2015 | Teraoka et al. |
| 2015/0333365 A1 | 11/2015 | Sato et al. |
| 2016/0118693 A1 | 4/2016 | Koep |
| 2018/0123168 A1 | 5/2018 | Furukawa et al. |

FOREIGN PATENT DOCUMENTS

| | | |
|---|---|---|
| JP | 2004-179158 A | 6/2004 |
| JP | 2006-277997 A | 10/2006 |
| JP | 2010-033877 A | 2/2010 |
| JP | 2010-080426 A | 4/2010 |
| JP | 4615339 B2 | 1/2011 |
| JP | 2011-073962 A | 4/2011 |
| JP | 2013-037992 A | 2/2013 |
| JP | 2014-154236 A | 8/2014 |
| JP | 2015-013775 A | 1/2015 |
| JP | 2015-088391 A | 5/2015 |
| JP | 2015-144061 A | 8/2015 |
| JP | 2015-153452 A | 8/2015 |
| WO | 2013/051478 A1 | 4/2013 |
| WO | 2013/130983 A2 | 9/2013 |

OTHER PUBLICATIONS

U.S. Appl. No. 15/161,958, filed May 23, 2016 in the name of Tsutomu Teraoka et al.
Jul. 27, 2016 Extended Search Report issued in European Patent Application No. 16173079.1.
Oct. 24, 2016 Extended Search Report issued in European Patent Application No. 16173080.9.
Sep. 14, 2017 Office Action issued in U.S. Appl. No. 15/161,958.
Aug. 1, 2019 Office Action issued in U.S. Appl. No. 15/161,833.
Jul. 9, 2018 Office Action issued in U.S. Appl. No. 15/161,958.
May 10, 2019 Office Action issued in U.S. Appl. No. 15/161,958.
Tadanaga, Kiyoharu et al., "Low Temperature Synthesis of Highly Ion Conductive $Li_7La_3Zr_2O_{12}$—$Li_3BO_3$ Composites", (2013), Electrochemistry Communications 33, p. 51-54.
Aug. 13, 2019 Office Action Issued in U.S. Appl. No. 15/161,958.
Jul. 9, 2018 Office Action issued in U.S. Appl. No. 15/161,833.
Nov. 5, 2018 Office Action issued in U.S. Appl. No. 15/161,833.

ELECTRODE COMPOSITE BODY, METHOD OF MANUFACTURING ELECTRODE COMPOSITE BODY, AND LITHIUM BATTERY

This application is a Divisional of application Ser. No. 15/161,833, filed May 23, 2016, which claims the benefit of priority to Japanese Application No. 2015-115507, filed on Jun. 8, 2015. The entire contents of the prior applications are hereby incorporated by reference herein in their entirety.

BACKGROUND

1. Technical Field

Several aspects of the present invention relate to an electrode composite body, a method of manufacturing the electrode composite body, and a lithium battery.

2. Background Art

As a power supply of various electrical apparatuses including a portable information apparatus, a battery such as a lithium battery (including a primary battery and a secondary battery) has been used. The lithium battery includes a positive electrode, a negative electrode, and an electrolyte layer that is provided between layers of the positive electrode and the negative electrode and mediates lithium ion conduction therebetween.

Recently, as a lithium battery in which a high energy density and stability are compatible with each other, there is suggested an all-solid type lithium battery that uses a solid electrolyte in a formation material of the electrolyte layer (for example, refer to JP-A-2006-277997, JP-A-2004-179158, and Japanese Patent No. 4615339).

Additional high output and high capacity are demanded for the all-solid type lithium battery, but it cannot be said that these characteristics are sufficiently obtained in the all-solid type lithium battery of the related art.

SUMMARY

An advantage of some aspects of the invention is to provide an electrode composite body capable of realizing a lithium secondary battery exhibiting a stable charge and discharge cycle when being applied to the lithium secondary battery, a method of manufacturing an electrode composite body which is capable of manufacturing the electrode composite body, and a lithium battery that includes the electrode composite body and exhibits the stable charge and discharge cycle.

The advantage can be accomplished by the following aspects of the invention.

An electrode composite body according to an aspect of the invention includes: an active material molded body including active material particles which include a lithium composite oxide and have a particle shape, and a communication hole that is provided between the active material particles; a first solid electrolyte layer that is provided on a surface of the active material molded body, and includes a first inorganic solid electrolyte; and a second solid electrolyte layer that is provided on the surface of the active material molded body, and includes a second inorganic solid electrolyte of which a composition is different from a composition of the first inorganic solid electrolyte, and which contains boron as a constituent element and is crystalline.

According to this configuration, an electrode composite body, which is capable of realizing a lithium secondary battery exhibiting a stable charge and discharge cycle when being applied to the lithium secondary battery, is obtained. In addition, since the second inorganic solid electrolyte is crystalline, material-intrinsic charge mobility is sufficiently exhibited. Accordingly, it is possible to sufficiently compensate a reduction in charge migration, which is caused by deficiency of the first solid electrolyte layer in the communication hole of the active material molded body, by the secondary solid electrolyte layer. As a result, it is possible to attain high capacity and high output of a lithium secondary battery.

In the electrode composite body according to the aspect of the invention, it is preferable that the lithium composite oxide is $LiCoO_2$.

According to this configuration, the active material particles allow charge migration between the active material particles and the second inorganic solid electrolyte to be more smoothly performed. According to this, a lithium secondary battery including the lithium composite oxide can realize a more stable charge and discharge cycle.

In the electrode composite body according to the aspect of the invention, it is preferable that the first inorganic solid electrolyte is $Li_{7-x}La_3(Zr_{2-x}, M_x)O_{12}$.

In the formula, M represents at least one kind of element selected from Nb, Sc, Ti, V, Y, Hf, Ta, Al, Si, Ga, Ge, Sn, and Sb, and X represents a real number of 0 to 2].

According to this configuration, a first inorganic solid electrolyte, in which an unintended reaction with the second inorganic solid electrolyte is hardly caused to occur, is obtained. In addition, when using the first inorganic solid electrolyte as described above, it is possible to further raise the charge mobility between the active material molded body and the first solid electrolyte layer.

In the electrode composite body according to the aspect of the invention, it is preferable that the second inorganic solid electrolyte is $Li_{2+x}B_xC_{1-x}O_3$ (X represents a real number that is greater than 0 and less than 1).

According to this configuration, a second inorganic solid electrolyte, which is less likely to be affected by moisture and has relatively high charge mobility, is obtained. In addition, when using the second inorganic solid electrolyte as described above, ion conductivity in the electrode composite body is enhanced. As a result, an electrode composite body, which is capable of realizing a lithium secondary battery in which reliability is high over a long period of time and high capacity and high output are attained, is obtained.

A method of manufacturing an electrode composite body according to another aspect of the invention includes: supplying a solution of a first inorganic solid electrolyte to come into contact with an active material molded body including active material particles which include a lithium composite oxide and have a particle shape, and a communication hole that is provided between the active material particles so as to impregnate the solution into the communication hole; heating the active material molded body that is impregnated with the solution; supplying a solid material of a second inorganic solid electrolyte, of which a composition is different from a composition of the first inorganic solid electrolyte and contains boron as a constituent element, to come into contact with the active material molded body; melting the solid material of the second inorganic solid electrolyte, and impregnating the resultant molten material of the second inorganic solid electrolyte into the communication hole; and solidifying the molten material to be crystallized.

According to this configuration, it is possible to efficiently manufacture an electrode composite body capable of realizing the lithium secondary battery that exhibits the stable charge and discharge cycle.

A method of manufacturing an electrode composite body according to still another aspect of the invention includes: supplying a solid material of a first inorganic solid electrolyte and a solid material of a second inorganic solid electrolyte, of which a melting point is lower than a melting point of the first inorganic solid electrolyte and which contains boron as a constituent element, to come into contact with an active material molded body including active material particles which include a lithium composite oxide and have a particle shape, and a communication hole that is provided between the active material particles; melting the solid material of the second inorganic solid electrolyte, and impregnating the resultant molten material of the second inorganic solid electrolyte into the communication hole in combination with the solid material of the first inorganic solid electrolyte; and solidifying the molten material to be crystallized.

According to this configuration, it is possible to efficiently manufacture an electrode composite body capable of realizing the lithium secondary battery that exhibits the stable charge and discharge cycle.

A lithium battery according to yet another aspect of the invention includes: the electrode composite body according to the aspect of the invention; a current collector that is provided on one surface of the electrode composite body to come into contact with the active material molded body; and an electrode that is provided on the other surface of the electrode composite body to come into contact with the first solid electrolyte layer or the second solid electrolyte layer.

According to this configuration, a lithium secondary battery, which exhibits the stable charge and discharge cycle, is obtained. In addition, a lithium secondary battery, in which high capacity and high output are attained, is obtained.

It is preferable that the lithium battery further includes a third solid electrolyte layer that is provided between the electrode composite body and the electrode, and includes a third inorganic solid electrolyte that contains boron as a constituent element and is amorphous.

According to this configuration, a lithium secondary battery, which exhibits the stable charge and discharge cycle over a longer period of time, is obtained.

BRIEF DESCRIPTION OF THE DRAWINGS

The invention will be described with reference to the accompanying drawings, wherein like numbers reference like elements.

DESCRIPTION OF EXEMPLARY EMBODIMENTS

Figure 1:
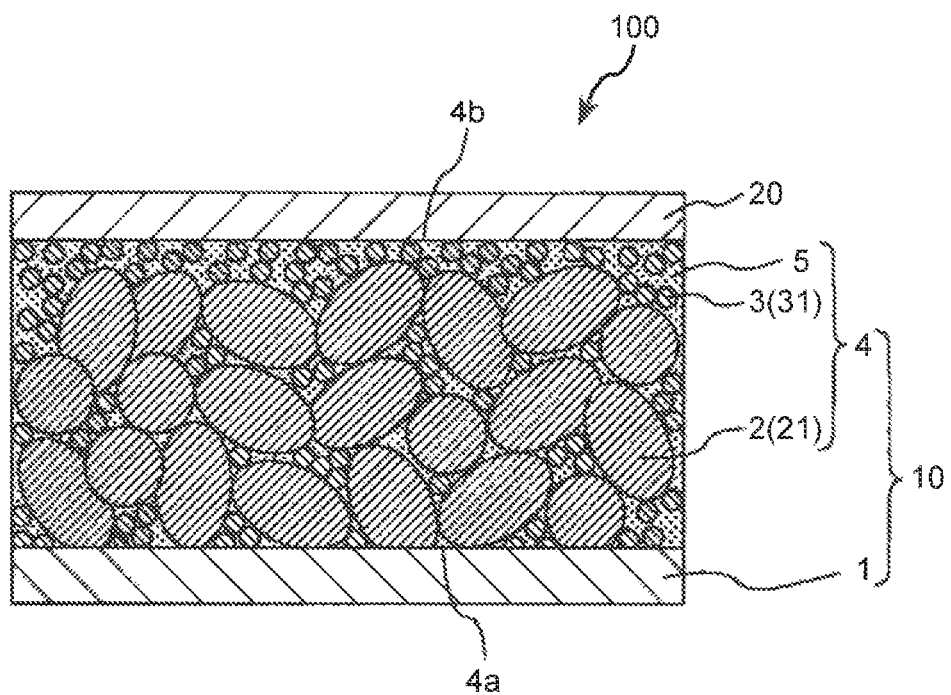
FIG. 1 is a longitudinal cross-sectional view illustrating a lithium secondary battery to which a first embodiment of a lithium battery according to the invention is applied.

Hereinafter, an electrode composite body, a method of manufacturing the electrode composite body, and a lithium battery according to the invention will be described with reference to the accompanying drawings.

In addition, in the drawings which are used for the description, dimensions, ratios, and the like of respective constituent elements are appropriately made different for easy understanding of the drawings and for easy understanding of explanation, but the difference in the drawings is made for convenience. In addition, for convenience of explanation, an upper side and a lower side of the illustration will be described as "upper" and "lower", respectively.

First Embodiment

In this embodiment, description will be given of an electrode composite body, a method of manufacturing the electrode composite body, and a lithium battery according to the invention.

First, a lithium secondary battery 100, to which the lithium battery according to the invention is applied, will be described. FIG. 1 is a longitudinal cross-sectional view of the lithium secondary battery 100.

The lithium secondary battery 100 includes a stacked body 10, and an electrode 20 that is joined to the stacked body 10. The lithium secondary battery 100 is a so-called all-solid type lithium (ion) secondary battery.

The stacked body 10 includes a current collector 1, an active material molded body 2, a first solid electrolyte layer 3, and a second solid electrolyte layer 5. In addition, in the following description, a configuration provided with the active material molded body 2, the first solid electrolyte layer 3, and the second solid electrolyte layer 5 is referred to as an electrode composite body 4. The electrode composite body 4 is located between a current collector 1 and the electrode 20, and a pair of opposite surfaces 4a and 4b are joined to the current collector 1 and the electrode 20, respectively. Accordingly, the stacked body 10 has a configuration in which the current collector 1 and the electrode composite body 4 are stacked.

The current collector 1 is an electrode that extracts a current generated through a battery reaction, and is provided on one surface 4a of the electrode composite body 4 to come into contact with the active material molded body 2 that is exposed from the first solid electrolyte layer 3 and the second solid electrolyte layer 5.

The current collector 1 functions as a positive electrode in a case where the active material molded body 2 is constituted by a positive electrode active material, and functions as a negative electrode in a case where the active material molded body 2 is constituted by a negative electrode active material.

In addition, examples of a formation material (constituent material) of the current collector 1 include one kind of metal (elementary metal substance) that is selected from the group consisting of copper (Cu), magnesium (Mg), titanium (Ti), iron (Fe), cobalt (Co), nickel (Ni), zinc (Zn), aluminum (Al), germanium (Ge), indium (In), gold (Au), platinum (Pt), silver (Ag), and palladium (Pd), an alloy including two or more kinds of metal elements selected from the group, and the like.

The shape of the current collector 1 is not particularly limited, and examples thereof include a sheet shape, a foil shape, a network shape, and the like. In addition, a joining surface of the current collector 1 with the electrode composite body 4 may be flat, or unevenness may be formed on the joining surface. In this case, it is preferable that the joining surface is formed so that a contact area with the electrode composite body 4 becomes the maximum.

The active material molded body 2 is a porous molded body which includes particle-like active material particles 21 that contains an active material as a formation material, and which is formed in such a manner that a plurality of the active material particles 21 are three-dimensionally connected.

The active material molded body 2, which is the porous molded body, has a plurality of pores. A vacancy in the plurality of pores is a void of the active material molded body 2. Portions, which communicate with each other in a network shape at the inside of the active material molded body 2, form a communication hole. When the first solid electrolyte layer 3 enters the communication hole, it is possible to secure a wide contact area between the active material molded body 2 and the first solid electrolyte layer 3. In addition, the second solid electrolyte layer 5 is provided to bury a void that is not buried by the first solid electrolyte layer 3. According to this, a gap between the active material particles 21 and granular bodies 31 is buried with the second solid electrolyte layer 5, and the second solid electrolyte layer 5 contributes to enhancement of charge mobility between the active material particles 21 and the granular bodies 31. As a result, in the lithium secondary battery 100, stabilization of a charge and discharge cycle is attained.

The current collector 1 may function as a positive electrode or a negative electrode by appropriately selecting a kind of an active material formation material of the active material particles 21.

In a case where the current collector 1 is set as a positive electrode, as a formation material of the active material particles 21, for example, a known lithium composite oxide may be preferably used as a positive electrode active material.

In addition, in this specification, the "lithium composite oxide" represents an oxide which essentially includes lithium, and includes two or more kinds of metal ions as a whole, and in which existence of oxo acid ions is not recognized.

Examples of the lithium composite oxide include $LiCoO_2$, $LiNiO_2$, $LiMn_2O_4$, $Li_2Mn_2O_3$, $LiFePO_4$, $Li_2FeP_2O_7$, $LiMnPO_4$, $LiFeBO_3$, $Li_3V_2(PO_4)_3$, $Li_2CuO_2$, $LiFeF_3$, $Li_2FeSiO_4$, $Li_2MnSiO_4$, and the like. In addition, in this specification, a solid-solution, in which a part of atoms in a crystal of the lithium composite oxide is substituted with other transition metals, typical metals, alkali metals, alkali rare-earth elements, lanthanoids, chalcogenides, halogens, and the like, is included in the lithium composite oxide, and this solid-solution can also be used as the positive electrode active material.

Among these, $LiCoO_2$ is preferably used as the lithium composite oxide. This active material allows charge migration to be more smoothly performed between the active material and a second inorganic solid electrolyte that contains boron as a constituent element and is crystalline. According to this, the lithium secondary battery 100, which includes the active material, can realize a more stable charge and discharge cycle.

On the other hand, in a case where the current collector 1 is set as a negative electrode, with regard to the formation material of the active material molded body 2, for example, a lithium composite oxide such as $Li_4Ti_5O_{12}$ and $Li_2Ti_3O_7$ can be used as a negative electrode active material.

When including the lithium composite oxide, delivery of electrons is performed between the plurality of active material particles 21, and delivery of lithium ions is performed between the active material particles 21 and the first solid electrolyte layer 3, and thus the active material particles 21 exhibit a function as the active material molded body 2 in a satisfactory manner.

An average particle size of the active material particles 21 is preferably 300 nm to 5 μm, more preferably 450 nm to 3 μm, and still more preferably 500 nm to 1 μm. When using the active material having the average particle size, it is possible to set a porosity of the active material molded body 2, which is obtained, in a preferable range. According to this, it is easy to increase a surface area of the active material molded body 2 on an inner side of the pores, and it is easy to increase a contact area between the active material molded body 2 and the first solid electrolyte layer 3. Accordingly, it is easy to allow the lithium battery using the stacked body 10 to have high capacity.

Here, for example, the porosity can be measured from (1) the volume (apparent volume) of the active material molded body 2 including the pores which is obtained from external dimensions of the active material molded body 2, (2) the mass of the active material molded body 2, and (3) the density of an active material that constitutes the active material molded body 2 on the basis of the following expression (I).

$$\text{Porosity (\%)}=[1-\text{mass of active material molded body}/((\text{apparent volume})\times(\text{density of active material}))]\times 100 \quad (I)$$

It is preferable the porosity is 10% to 50%, and more preferably 30% to 50%. When the active material molded body 2 has the porosity described above, it is easy to increase a surface area of the active material molded body 2 on an inner side of the pores, and it is easy to increase a contact area between the active material molded body 2 and the first solid electrolyte layer 3. Accordingly, it is easy to allow the lithium battery using the stacked body 10 to have high capacity.

When an average particle size of the active material particles 21 is less than the above-described lower limit, a radius of the pores in the active material molded body that is formed is likely to be as small as several nm in accordance with the kind of the formation material of the first solid electrolyte layer 3, and thus it is difficult to impregnate a liquid material including a precursor of the first inorganic solid electrolyte into the pores. As a result, there is a concern that it is difficult to form the first solid electrolyte layer 3 that comes into contact with a surface on an inner side of the pores.

In addition, when the average particle size of the active material particles 21 is greater than the above-described upper limit, a specific surface area that is a surface area per unit mass of the active material molded body 2 that is formed decreases, and thus there is a concern that the contact area between the active material molded body 2 and the first solid electrolyte layer 3 may decrease. According to this, there is a concern that a sufficient output may not be obtained in the lithium secondary battery 100. In addition, an ion diffusion distance from the inside of the active material particles 21 to the first solid electrolyte layer 3 is lengthened, and thus there is a concern that it is difficult for the lithium composite oxide in the vicinity of the center of the active material particles 21 to contribute to the function of the battery.

In addition, for example, the average particle size of the active material particles 21 can be measured by obtaining a median diameter by using a light-scattering type particle size distribution measuring device (nano track UPA-EX250, manufactured by Nikkiso Co., Ltd.) after dispersing the active material particles 21 in n-octanol to have a concentration in a range of 0.1% by mass to 10% by mass.

In addition, although details will be described later, the porosity of the active material molded body 2 can be controlled by using a pore forming material, which is composed of a particle-like organic material, in a process of forming the active material molded body 2.

A first inorganic solid electrolyte is set as a formation material (constituent material) of the first solid electrolyte layer 3, and the first solid electrolyte layer 3 is provided to come into contact with the surface, which includes a surface of the active material molded body 2 on an inner side of the pores (voids), of the active material molded body 2.

Examples of the first inorganic solid electrolyte include oxides, sulfides, halides, and nitrides such as $SiO_2$—$P_2O_5$—$Li_2O$, $SiO_2$—$P_2O_5$—$LiCl$, $Li_2O$—$LiCl$—$B_2O_3$, $Li_{3.4}V_{0.6}Si_{0.4}O_4$, $Li_{14}ZnGe_4O_{16}$, $Li_{3.6}V_{0.4}Ge_{0.6}O_4$, $Li_{1.3}Ti_{1.7}Al_{0.3}(PO_4)_3$, $Li_{2.88}PO_{3.73}N_{0.14}$, $LiNbO_3$, $Li_{0.35}La_{0.55}TiO_3$, $Li_7La_3Zr_2O_{12}$, $Li_2S$—$SiS_2$, $Li_2S$—$SiS_2$—$LiI$, $Li_2S$—$SiS_2$—$P_2S_5$, LiPON, $Li_3N$, LiI, LiI—$CaI_2$, LiI—CaO, $LiAlCl_4$, $LiAlF_4$, LiI—$Al_2O_3$, LiF—$Al_2O_3$, LiBr—$Al_2O_3$, $Li_2O$—$TiO_2$, $La_2O_3$—$Li_2O$—$TiO_2$, $Li_3NI_2$, $Li_3N$—LiI—LiOH, $Li_3N$—LiCl, $Li_6NBr_3$, $LiSO_4$, $Li_4SiO_4$, $Li_3PO_4$—$Li_4SiO_4$, $Li_4GeO_4$—$Li_3VO_4$, $Li_4SiO_4$—$Li_3VO_4$, $Li_4GeO_4$—$Zn_2GeO_2$, $Li_4SiO_4$—$LiMoO_4$, and $LiSiO_4$—$Li_4ZrO_4$. In addition, the first inorganic solid electrolyte may be crystalline or amorphous. In addition, in this specification, a solid-solution, in which a part of atoms of the compositions is substituted with other transition metals, typical metals, alkali metals, alkali rare-earth elements, lanthanoids, chalcogenides, halogens, and the like, can be used as the first inorganic solid electrolyte.

In addition, among the above-described materials, as the first inorganic solid electrolyte, particularly, an electrolyte that does not contain boron as a constituent element is preferably used, and a lithium composite oxide that contains La and Zr as the constituent element is more preferably used.

Specifically, a lithium composite oxide expressed by the following Formula (II) can be exemplified.

$$Li_{7-x}La_3(Zr_{2-x}M_x)O_{12} \tag{II}$$

In Formula, M represents at least one kind of element selected from Nb, Sc, Ti, V, Y, Hf, Ta, Al, Si, Ga, Ge, Sn, and Sb, and X represents a real number of 0 to 2.

In addition, particularly, in Formula (II), it is preferable that M is at least one kind of element among niobium (Nb) and tantalum (Ta). According to this, it is possible to further raise lithium ion conductivity of the first inorganic solid electrolyte that is obtained, and it is possible to further enhance the mechanical strength of the first inorganic solid electrolyte.

In addition, in Formula (II), X, that is, a substitution rate of the metal M is preferably 1 to 2, and more preferably 1.4 to 2. When X is too small, there is a concern that the above-described function may not be sufficiently exhibited in the first inorganic solid electrolyte in accordance with the kind of the metal M.

In addition, the lithium composite oxide illustrated in Formula (II) may have any crystal structure such as cubic and tetragonal, but it is preferable that the lithium composite oxide has a cubic garnet type crystal structure. According to this, an additional improvement in the ion conductivity of the first inorganic solid electrolyte is attained.

In addition, more specifically, $Li_{6.8}La_3Zr_{1.8}Nb_{0.2}O_{12}$ is more preferably used.

When the first inorganic solid electrolyte as described above exists in combination with a second inorganic solid electrolyte containing boron as a constituent element, an unintended reaction with the second inorganic solid electrolyte is hardly caused to occur. Accordingly, when using the first inorganic solid electrolyte as described above, it is possible to further raise the charge mobility between the active material molded body 2 and the first solid electrolyte layer 3.

The first inorganic solid electrolyte, which is a constituent material of the first solid electrolyte layer 3, is generated by baking (heating) a precursor of the first inorganic solid electrolyte. During the baking, the first inorganic solid electrolyte that is generated constitutes the granular bodies 31 each of which is composed of a secondary particle that is formed through granulation of primary particles. According to this, the first solid electrolyte layer 3 is provided to come into contact with the surface, which includes a surface of the active material molded body 2 on an inner side of the pores, of the active material molded body 2. When considering that the first solid electrolyte layer 3 is configured as an aggregate of the granular bodies 31, as is the case with the active material molded body 2, the first solid electrolyte layer 3 is also configured as a porous body.

It is preferable that the ion conductivity of the first solid electrolyte layer 3 is $5 \times 10^{-5}$ S/cm or greater, and more preferably $1 \times 10^{-5}$ S/cm or greater. When the first solid electrolyte layer 3 has the ion conductivity, ions, which are included in the first solid electrolyte layer 3 at a position distant from the surface of the active material molded body 2, also reach the surface of the active material molded body 2, and can contribute to a battery reaction in the active material molded body 2. According to this, a utilization rate of the active material in the active material molded body 2 is improved, and thus it is possible to increase the capacity. At this time, when the ion conductivity is less than the lower limit, in the active material molded body 2, only an active material in the vicinity of a surface layer on a surface side that faces a counter electrode contributes to the battery reaction depending on the kind of the first solid electrolyte layer 3, and thus there is a concern that the capacity decreases.

In addition, the "ion conductivity of the first solid electrolyte layer 3" represents "total ion conductivity" that is the sum of "bulk conductivity" of the above-described inorganic solid electrolyte that constitutes the first solid electrolyte layer 3, and "grain boundary ion conductivity" that is conductivity between crystal particles in a case where the inorganic solid electrolyte is crystalline.

In addition, for example, the ion conductivity of the first solid electrolyte layer 3 can be measured as follows. First, solid electrolyte powders are press-molded into a tablet shape at 624 MPa, and the resultant press-molded body is sintered in an atmospheric atmosphere at 700° C. for 8 hours. Then, a platinum electrode having a diameter of 0.5 cm and a thickness of 100 nm is formed on both surfaces of the press-molded body through sputtering, and the press-molded body is set as an object to be inspected. Then, the ion conductivity is measured by an AC impedance method. As a measurement device, for example, an impedance analyzer (manufactured by Solartron, model number: SI1260) is used.

A second inorganic solid electrolyte is set as a formation material (constituent material) of the second solid electrolyte layer 5, and as is the case with the first solid electrolyte layer 3, the second solid electrolyte layer 5 is provided to come into contact with the surface, which includes a surface of the active material molded body 2 on an inner side of the pores (voids), of the active material molded body 2.

The second inorganic solid electrolyte is a solid electrolyte that is capable of conducting lithium ions. In addition, the second inorganic solid electrolyte has a composition different from that of the first inorganic solid electrolyte, and is an inorganic solid electrolyte (hereinafter, also referred to simply as "boron-containing electrolyte") that contains boron as a constituent element. The above-described second inorganic solid electrolyte is less likely to be affected by moisture in comparison to a SiO-based electrolyte, and thus it is possible to further enhance long-term stability of the second solid electrolyte layer 5. That is, when penetration of moisture occurs, in the first solid electrolyte layer 3, a defect occurs in a conduction path of lithium ions, and thus conductivity decreases. However, when the second solid electrolyte layer 5 is formed, generation of the defect is suppressed. As a result, stabilization of the charge and discharge cycle is attained, and thus the lithium secondary battery 100, which is obtained, has higher reliability.

As described above, examples of the second inorganic solid electrolyte include a boron-containing electrolyte. Specifically, a lithium composite oxide such as $Li_{2+X}B_XC_{1-X}O_3$ (X represents a real number of greater than 0 and less than 1) that contains boron as a constituent element is used, and $Li_{2.2}C_{0.8}B_{0.2}O_3$ is preferably used. Particularly, in a case of being crystalline, the second inorganic solid electrolyte is less likely to be affected by moisture, and has relatively high charge mobility. According to this, when using the second inorganic solid electrolyte as described above, ion conductivity in the electrode composite body 4 is enhanced. As a result, in the lithium secondary battery 100 that is obtained, reliability is high over a long period of time, and additional stabilization in the charge and discharge cycle is attained.

In addition, the second inorganic solid electrolyte is a crystalline solid electrolyte. In the second solid electrolyte layer 5 including the second inorganic solid electrolyte, since the second inorganic solid electrolyte is crystalline, material-intrinsic charge mobility is sufficiently exhibited. According to this, it is possible to sufficiently compensate a reduction in charge migration, which is caused by deficiency of the first solid electrolyte layer 3 in the voids of the active material molded body 2, by the second solid electrolyte layer 5. As a result, it is possible to attain high capacity and high output of the lithium secondary battery 100.

In addition, from the above-described viewpoint, a composition, which is capable of being crystallized when being molted and solidified, is selected for the second inorganic solid electrolyte.

In addition, the "crystalline" in this specification includes both a single crystal and a polycrystal.

In addition, for example, it is possible to specify whether or not the second inorganic solid electrolyte is crystalline in accordance with whether or not a peak derived from a crystal is recognized in crystal structure analysis by using X-ray diffraction (XRD).

In addition, for example, the second solid electrolyte layer 5 may further include other solid electrolytes, for example, an inorganic solid electrolyte (hereinafter, also referred to simply as "silicon-containing electrolyte), which contains silicon as a constituent element, as necessary. Specifically, a lithium composite oxide, which contains silicon as a constituent element, may be exemplified, and one or both of $Li_2SiO_3$ and $Li_6SiO_5$ are preferably used.

In this case, in the second solid electrolyte layer 5, the silicon-containing electrolyte is included in a content rate less than that of the boron-containing electrolyte. According to this, the effect, which is exhibited by the above-described boron-containing electrolyte, can be necessarily and sufficiently exhibited.

An average grain size of a crystal included in the second solid electrolyte layer 5 that is formed also varies depending on the size of the pores of the active material molded body 2, and thus there is no particular limitation to the average grain size. However, it is preferable that the average grain size is 5 μm to 200 μm, and preferably 10 μm to 100 μm. When the average grain size of the crystal is set in the above-described range, in the second solid electrolyte layer 5, the second inorganic solid electrolyte exhibits material-intrinsic charge mobility. According to this, when the inside of the pores of the active material molded body 2 is buried with the second solid electrolyte layer 5, it is possible to attain high capacity and high output of the lithium secondary battery 100 in a more reliable manner.

In addition, for example, the average grain size of the crystal can be obtained by observing a cross-section of the electrode composite body 4 with an electron microscope and the like, and by obtaining the maximum length on the cross-section of the crystal of the second inorganic solid electrolyte as a grain size, and by averaging 10 or more grain sizes.

In addition, although determined in accordance with the volume of the pores, as an example, the amount of the second solid electrolyte layer 5, which is impregnated, is preferably 20% by volume or greater on the basis of the volume of the first solid electrolyte layer 3, and more preferably 30% by volume or greater. When a ratio between the volume of the second solid electrolyte layer 5 and the volume of the first solid electrolyte layer 3 is set in the above-described range, balance between an operation driven by the first solid electrolyte layer 3, and an effect driven by the second solid electrolyte layer 5 becomes optimized. As a result, it is possible to attain additional high capacity and high output of the lithium secondary battery 100 while attaining additional stability of the charge and discharge cycle.

In addition, an organic material such as a binder for joining of active materials and a conductive auxiliary agent for securement of conductivity of the active material molded body 2 may be included in the stacked body 10. However, in this embodiment, during molding of the active material molded body 2, the molding is performed without using the binder, the conductive auxiliary agent, and the like, and the active material molded body 2 is constituted by almost an inorganic material. Specifically, in this embodiment, a mass reduction rate when heating the electrode composite body 4 at 400° C. for 30 minutes is set to 5% by mass or less. In addition, it is preferable that the mass reduction rate is 3% by mass or less, more preferably 1% by mass or less, and still more preferably a range in which the mass reduction is not observed, or an error range. Since the electrode composite body 4 has this mass reduction rate, a material such as a solvent and absorbed water which are evaporated under predetermined heating conditions, and an organic material that is combusted or oxidized, and is vaporized under predetermined heating conditions is included in the electrode composite body 4 only by 5% by mass or less on the basis of the entirety of the configuration.

In addition, the mass reduction rate of the electrode composite body 4 can be calculated as follows by using a thermogravimetry-differential thermal analyzer (TG-DTA). First, the electrode composite body 4 is heated under predetermined heating conditions, the mass of the electrode composite body 4 after heating under the predetermined heating conditions is measured, and the mass reduction rate is calculated from a ratio between the mass before heating and the mass after heating.

In the stacked body 10 of this embodiment, a communication hole in which a plurality of pores communicate with each other at the inside of the active material molded body 2 in a network shape, and a solid portion of the active material molded body 2 also forms a network structure. For example, it is known that $LiCoO_2$ that is a positive electrode active material has anisotropy in electron conductivity of a crystal. According to this, when forming an active material molded body by using $LiCoO_2$ as a formation material, in a configuration, in which pores extend in a specific direction, similar to a case where pores are formed through machining, it is considered that electron conduction is less likely to occur at the inside depending on a direction of a crystal which exhibits electron conductivity. However, as is the case with the active material molded body 2, when the pores communicate with each other in a network shape, and the solid portion of the active material molded body 2 has the network structure, it is possible to form a continuous surface, which is electrochemically active, without depending on the anisotropy in the electron conductivity or ion conductivity of a crystal. According to this, it is possible to secure relatively satisfactory electron conductivity without depending on the kind of an active material that is used.

In addition, in the stacked body 10 of this embodiment, since the electrode composite body 4 has the above-described configuration, the addition amount of the binder or the conductive auxiliary agent which is included in the electrode composite body 4 is suppressed, and a capacity density per unit volume of the stacked body 10 is further improved in comparison to a case of using the binder or the conductive auxiliary agent.

In addition, in the stacked body 10 (electrode composite body 4) of this embodiment, the first solid electrolyte layer 3 also comes into contact with a surface of the porous active material molded body 2 on an inner side of the pores. According to this, a contact area between the active material molded body 2 and the first solid electrolyte layer 3 further increases in comparison to a case where the active material molded body 2 is not a porous body, or a case where the first solid electrolyte layer 3 is not formed inside the pores, and thus it is possible to reduce interfacial impedance. Accordingly, satisfactory charge migration is possible at an interface between the active material molded body 2 and the first solid electrolyte layer 3.

Accordingly, in the lithium secondary battery 100 including the stacked body 10, capacity per unit volume is further improved and higher output is attained in comparison to other lithium secondary batteries which do not include the stacked body 10.

In addition, in the stacked body 10 of this embodiment, with regard to the inside of the pores of the porous active material molded body 2, at least a part of the voids, which are not buried in the first solid electrolyte layer 3, is buried with the second solid electrolyte layer 5. According to this, it is possible to enhance charge migration between the active material molded body 2 and the first solid electrolyte layer 3 by the second solid electrolyte layer 5, and it is also possible to enhance charge migration in the first solid electrolyte layer 3. As a result, it is possible to attain additional high capacity and high output of the lithium secondary battery 100.

Particularly, the second inorganic solid electrolyte, which is included in the second solid electrolyte layer 5, is less likely to be affected by moisture, and has excellent charge mobility derived from a crystalline structure. According to this, in the electrode composite body 4, high charge mobility is retained over a long period of time, and thus it is possible to secure long-term reliability of the lithium secondary battery 100.

In addition, in the electrode composite body 4 including the active material molded body 2, the first solid electrolyte layer 3, and the second solid electrolyte layer 5 as described above, the active material molded body 2 and the first solid electrolyte layer 3 are exposed from the one surface 4a, and one or both of the first solid electrolyte layer 3 and the second solid electrolyte layer 5 are exposed from the other surface 4b. In addition, in this state, the current collector 1 is joined to the one surface 4a, and the electrode 20 is joined to the other surface 4b. According to this configuration, in the lithium secondary battery 100, it is possible to prevent the electrode 20 and the current collector 1 from being connected through the active material molded body 2, that is, it is possible to prevent short-circuit. Accordingly, the first solid electrolyte layer 3 and the second solid electrolyte layer 5 also function as a short-circuit prevention layer that prevents short-circuit from occurring in the lithium secondary battery 100.

The electrode 20 is provided on the other surface 4b of the electrode composite body 4, which is opposite to the current collector 1, to come into contact with the first solid electrolyte layer 3 or the second solid electrolyte layer 5 without coming into contact with the active material molded body 2.

The electrode 20 functions as a negative electrode in a case where the active material molded body 2 is constituted by a positive electrode active material, and functions as a positive electrode in a case where the active material molded body 2 is constituted by a negative electrode active material.

As a formation material (constituent material) of the electrode 20, in a case where the electrode 20 is a negative electrode, for example, lithium (Li) can be exemplified, and in a case where the electrode 20 is a positive electrode, for example, aluminum (Al) can be exemplified.

Although not particularly limited, for example, the thickness of the electrode 20 is preferably 1 μm to 100 μm, and more preferably 20 μm to 50 μm.

Next, description will be given of a method of manufacturing the lithium secondary battery 100 of the first embodiment (method of manufacturing the electrode composite body according to the invention) which is illustrated in FIG. 1.

FIG. 2A to FIG. 8B are views illustrating the method of manufacturing the lithium secondary battery illustrated in FIG. 1.

[1] First, description will be given of two methods of manufacturing the active material molded body 2.

Figure 2A:
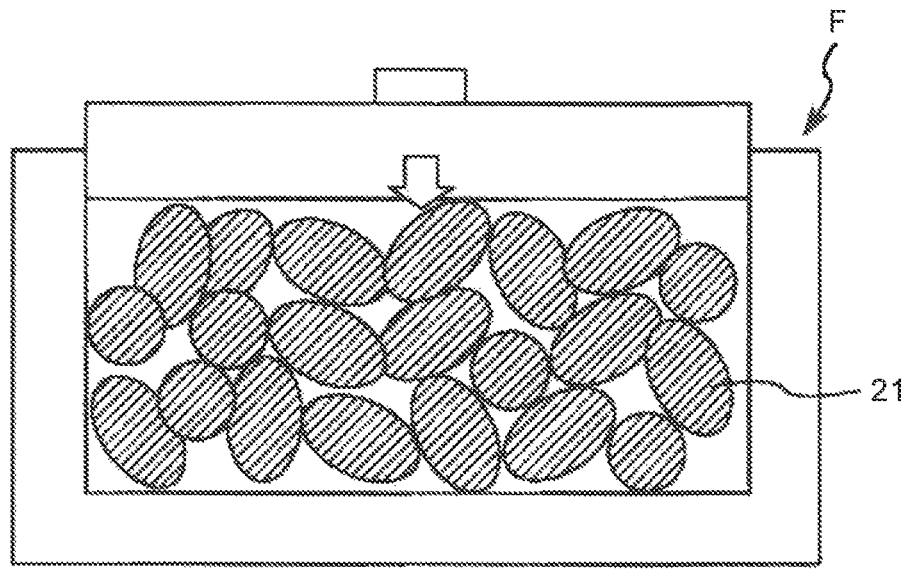
FIGS. 2A and 2B are views illustrating a method of manufacturing the lithium secondary battery illustrated in FIG. 1.
Figure 2B:
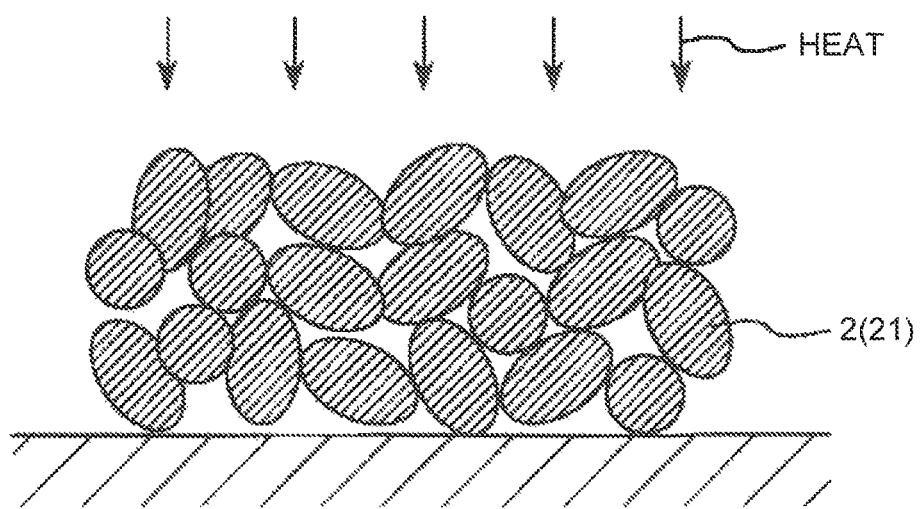

[1-1] FIGS. 2A and 2B are views illustrating a first method of manufacturing the active material molded body 2.

In the first method, the plurality of active material particles 21 having a particle shape are heated to three-dimensionally connect the plurality of active material particles 21 to each other, thereby obtaining the active material molded body 2 that is constituted by a porous body.

For example, as illustrated in FIGS. 2A and 2B, the active material molded body 2 is obtained as follows. A mixture of the plurality of active material particles 21 is compressed and molded by using a mold F having a space corresponding to a shape of the active material molded body 2 to be formed (refer to FIG. 2A), and the compression-molded body that is obtained is subjected to a heat treatment (refer to FIG. 2B).

It is preferable that the heating treatment is performed at a treatment temperature that is equal to or higher than 850° C. and is lower than the melting point of the lithium composite oxide that is used. According to this, it is possible to reliably obtain a molded body in which the active material particles 21 are sintered and integrated with each other. When performing the heat treatment in the temperature range, even when a conductive auxiliary agent is not added, resistivity of the active material molded body 2, which is obtained, can be preferably set to 700 Ω/m or less. According to this, the lithium secondary battery 100, which is obtained, can have a sufficient output.

At this time, when the treatment temperature is lower than 850° C., sintering does not progress sufficiently and electron conductivity itself inside a crystal of the active material deteriorates depending on the kind of lithium composite oxide that is used, and thus there is a concern that a desired output may not be obtained in the lithium secondary battery 100 that is obtained.

In addition, the treatment temperature is higher than the melting point of the lithium composite oxide, lithium ions excessively vaporize from the inside of a crystal of the lithium composite oxide, and the electron conductivity of the lithium composite oxide deteriorates, and thus there is a concern that the capacity of the electrode composite body 4, which is obtained, may decrease.

Accordingly, it is preferable that the treatment temperature is equal to or higher than 850° C. and lower than the melting point of the lithium composite oxide to obtain an appropriate output and appropriate capacity, more preferably 875° C. to 1000° C., and still more preferably 900° C. to 920° C.

In addition, it is preferable that the heat treatment of this process is performed for 5 minutes to 36 hours, and more preferably 4 hours to 14 hours.

When the above-described heat treatment is performed, growth of a grain boundary inside the active material particles 21, or sintering between the active material particles 21 progresses, and thus the active material molded body 2 that is obtained is likely to maintain a shape, and thus it is possible to reduce the amount of a binder that is added to the active material molded body 2. In addition, bonds are formed between the active material particles 21 through the sintering, and thus it is possible to form a migration route of electrons between the active material particles 21. As a result, it is also possible to suppress the amount of the conductive auxiliary agent that is added.

In addition, as the formation material of the active material particles 21, $LiCoO_2$ can be appropriately used. According to this, the above-described effect can be more significantly exhibited. That is, it is possible to more reliably obtain the active material molded body 2 in which the active material particles 21 are sintered and integrated with each other.

In addition, in the active material molded body 2 that is obtained, a plurality of the pores of the active material molded body 2 are configured as a communication hole in which the plurality of pores communicate with each other in a network shape on an inner side of the active material molded body 2.

In addition, an organic polymer compound such as polyvinylidene fluoride (PVDF) and polyvinyl alcohol (PVA) may be added to the formation material, which is used to form the active material particles 21, as a binder. The binder is combusted or oxidized in the heat treatment of the process, and thus the amount of the binder is reduced.

In addition, a particle-shaped pore forming material, in which a polymer or a carbon powder is used as a formation material, is preferably added to the above-described formation material, which is used, as a mold of the pores during compacting molding. When the pore forming material is mixed in, it is easy to control the porosity of the active material molded body 2. The pore forming material is decomposed and removed through combustion or oxidation during the heat treatment, and the amount of the pore forming material is reduced in the active material molded body 2 that is obtained.

An average particle size of the pore forming material is preferably 0.5 μm to 10 μm.

In addition, it is preferable that the pore forming material includes particles (first particles) in which a material having deliquescency is used as a formation material. When the first particles deliquesce, water, which occurs at the periphery of the first particles, functions as a binder for joining of the particle-shaped lithium composite oxide, and thus it is possible to maintain a shape from compression molding of the lithium composite oxide having a particle shape to the heat treatment. According to this, it is possible to obtain the active material molded body without addition of another binder or while reducing the amount of the binder that is added, and it is possible to easily realize the electrode composite body with high capacity.

Examples of the first particles include particles in which polyacrylic acid is used as a formation material.

In addition, it is preferable that the pore forming material further includes particles (second particles) in which a material having no deliquescence is used as a formation material. The pore forming material including the second particles is easy to handle. In addition, when the pore forming material having deliquescence, the porosity of the active material molded body may deviate from a desired setting value depending on the amount of moisture at the periphery of the pore forming material, but when the second particles, which do not deliquesce, are simultaneously included as the pore forming material, it is possible to suppress the deviation in the porosity.

According to the above-described first method, it is possible to obtain the active material molded body 2.

[1-2] Next, description will be given of a second method of manufacturing the active material molded body 2. The active material molded body 2 may be obtained by using a method in which slurry that contains the active material particles 21 is heated in addition to the method in which the active material particles 21 are compressed and molded, and the resultant molded body is heated as described above.

Figure 3A:
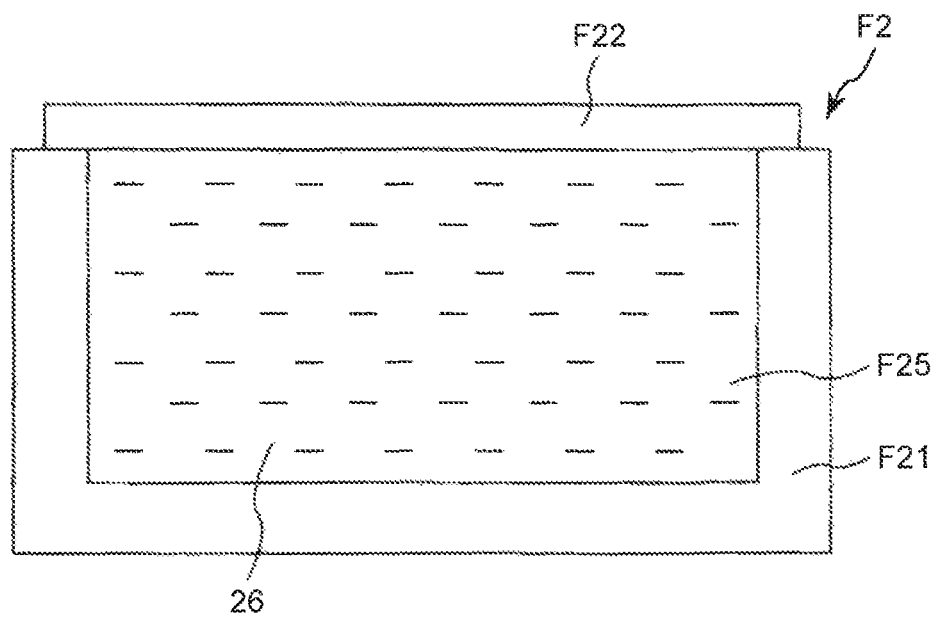
FIGS. 3A and 3B are views illustrating a method of manufacturing the lithium secondary battery illustrated in FIG. 1.
Figure 3B:
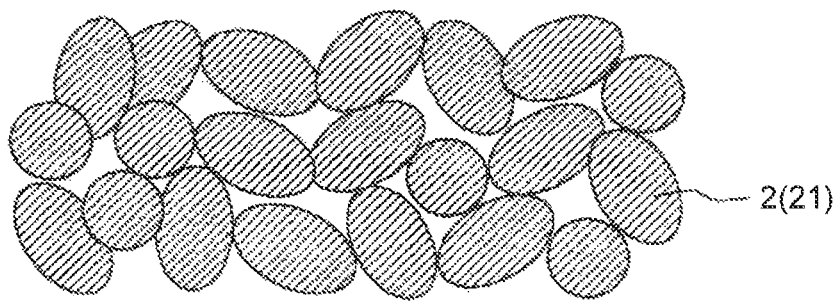

FIGS. 3A and 3B are views illustrating the second method of manufacturing the active material molded body 2.

The second method includes a preparation process of preparing slurry that contains the active material particles 21, and a drying process of heating the slurry to obtain the active material molded body 2. Hereinafter, the processes will be described.

First, a binder is dissolved in a solvent, and the active material particles 21 are dispersed in the resultant mixture to prepare slurry 26. In addition, a dispersing agent such as oleylamine may be included in the slurry 26.

Then, a mold F2, which includes a lower portion F21 having a concave portion F25, and a lid portion F22, is prepared, and the slurry 26 is supplied dropwise to the concave portion F25 of the lower portion F21, and then the lower portion F21 is covered with the lid portion F22 (refer to FIGS. 3A and 3B).

In addition, the total amount of the active material particles 21 contained in the slurry 26 is preferably 10% by mass to 60% by mass, and more preferably 30% by mass to 50% by mass. According to this, as described later, the active material molded body 2 having a preferable porosity is obtained.

In addition, although not particularly limited, examples of the binder include a cellulose-based binder, an acryl-based binder, a polyvinyl alcohol-based binder, a polyvinyl butyral-based binder, and the like in addition to polycarbonate, and these may be used alone or in a combination of two or more kinds thereof.

In addition, although not particularly limited, as the solvent, for example, an aprotic solvent is preferable. According to this, it is possible to reduce deterioration of the active material particles 21 due to contact with the solvent.

Specific examples of the aprotic solvent include butanol, ethanol, propanol, methyl isobutyl ketone, toluene, xylene, and the like, and a single solvent or a mixed solvent thereof can be used as the solvent.

Next, the slurry 26, which contains the active material particles 21, is heated to dry the slurry 26 and to sinter the active material particles 21 which are contained in the slurry 26, thereby obtaining the active material molded body 2.

In addition, a heating temperature during heating of the slurry 26 is set to the same conditions during the heat treatment of the compression-molded body as described above.

In addition, it is preferable that heating of the slurry 26 is performed in a multi-stage in which a temperature condition rises step by step. Specifically, it is preferable that after drying to room temperature, a temperature is raised from room temperature to 300° C. for 2 hours, the temperature is raised to 350° C. for 0.5 hours, the temperature is raised to 1000° C. for 2 hours, and then the concave portion F25 is covered with the lid portion F22, and baking is performed at 1000° C. for 8 hours. When the temperature is raised under the conditions, it is possible to reliably bake out the binder that is included in the solvent.

According to the second method, it is also possible to obtain the active material molded body 2.

[2] Next, description will be given of two methods of manufacturing the electrode composite body 4 by impregnating the first solid electrolyte layer 3 and the second solid electrolyte layer 5 into the active material molded body 2.

[2-1] FIGS. 4A and 4B, and FIGS. 5A and 5B are views of illustrating a first method of manufacturing the electrode composite body 4.

Figure 4A:
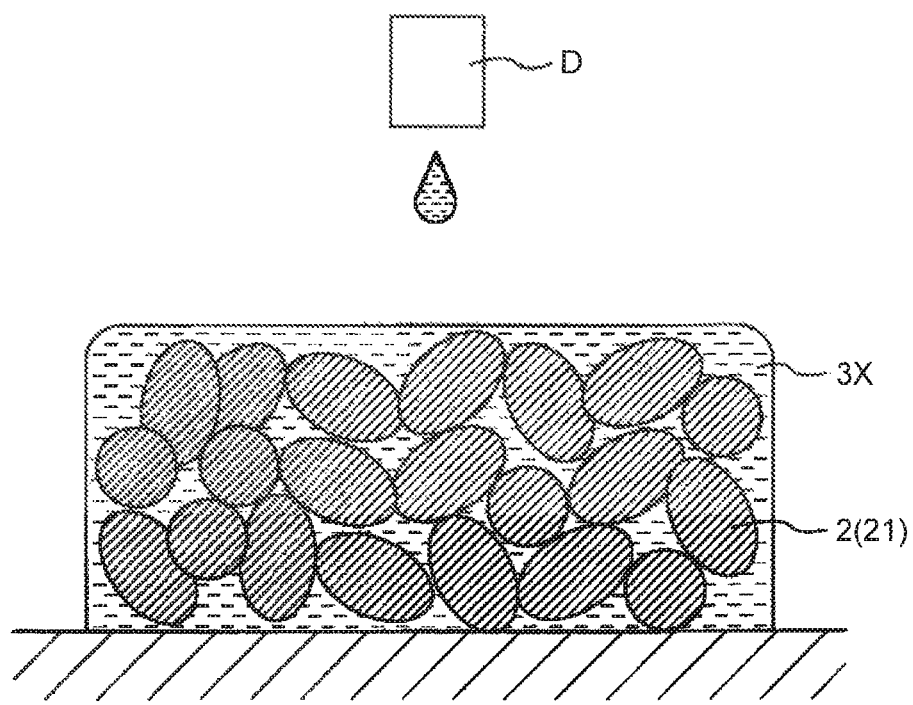
FIGS. 4A and 4B are views illustrating a method of manufacturing the lithium secondary battery illustrated in FIG. 1.
Figure 4B:
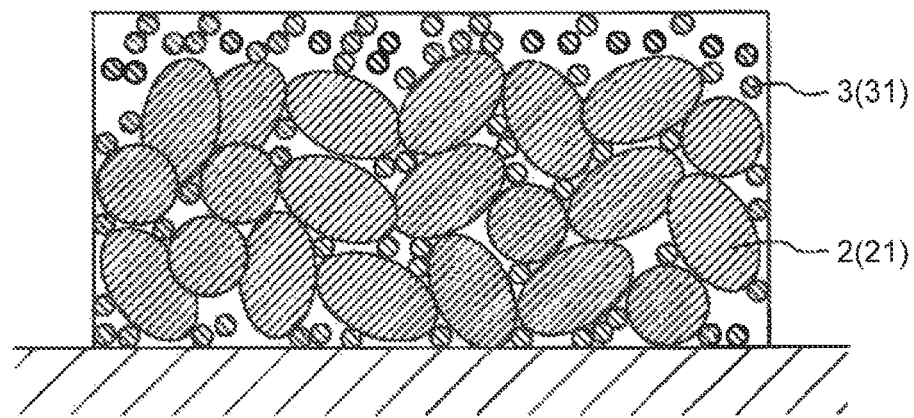

In the first method, first, as illustrated in FIGS. 4A and 4B, a liquid substance 3X, which includes a precursor of the first inorganic solid electrolyte, is applied to the surface, which includes a surface of the active material molded body 2 on an inner side of the pores, of the active material molded body 2 so as to impregnate the active material molded body 2 with the liquid substance 3X (refer to FIG. 4A). Then, the active material molded body 2 is baked to convert the precursor to the first inorganic solid electrolyte, thereby forming the first solid electrolyte layer 3 (refer to FIG. 4B).

The liquid substance 3X may include a solvent, in which the precursor is soluble, in addition to the precursor. In a case where the liquid substance 3X includes the solvent, for example, after the application of the liquid substance 3X by a dispenser D and the like, the solvent may be appropriately removed before baking. It is possible to employ a method selected from typically known methods such as heating, decompression, and blowing, or a method in which two or more kinds of the methods are combined for removal of the solvent.

As described above, since the first solid electrolyte layer 3 is formed through application of the liquid substance 3X having flowability, the first solid electrolyte layer 3 is also formed on a surface of the fine active material molded body 2 on an inner side of the pores. According to this, it is easy to increase a contact area between the active material molded body 2 and the first solid electrolyte layer 3, and a current density at the interface between the active material molded body 2 and the first solid electrolyte layer 3 is reduced. As a result, it is possible to attain high output of the lithium secondary battery 100.

In addition, the first inorganic solid electrolyte is generated by baking (heating) the precursor of the first inorganic solid electrolyte as described later, and during the baking, at least a part of the first inorganic solid electrolyte that is generated forms the granular bodies 31 each of which is composed of a secondary particle that is formed through granulation of primary particles. Accordingly, at least a part of the first solid electrolyte layer 3 is also formed inside the pores (voids) of the fine active material molded body 2, and is provided as an aggregate of the granular bodies 31. According to this, as is the case with the active material molded body 2, at least a part of the first solid electrolyte layer 3 is also formed as a porous body. Accordingly, the first solid electrolyte layer 3 is formed to fill the voids of the active material molded body 2, but a part of the voids also remains even after the filling.

Examples of the precursor of the first inorganic solid electrolyte include the following (A), (B), and (C).

(A) A composition that includes metal atoms of the first inorganic solid electrolyte in a ratio according to a compositional formula of the first inorganic solid electrolyte, and has a salt that becomes the first inorganic solid electrolyte through oxidation.

(B) A composition having a metal alkoxide that includes metal atoms of the first inorganic solid electrolyte in a ratio according to a compositional formula of the first inorganic solid electrolyte.

(C) A dispersed solution in which fine particles of the first inorganic solid electrolyte, or fine particle sol including metal atoms of the first inorganic solid electrolyte in a ratio according to a compositional formula of the first inorganic solid electrolyte is dispersed in a solvent or (A) or (B).

In addition, the salt that is included in (A) includes a metal complex. In addition, (B) is a precursor in a case of forming the first inorganic solid electrolyte by using a so-called sol-gel method. In (A) and (B), the granular bodies 31 are generated through a reaction of the precursor. In addition, in (C), a dispersion medium is removed to generate the granular bodies 31.

The precursor of the first inorganic solid electrolyte is baked under an atmospheric atmosphere at a temperature lower than the temperature during the heat treatment to obtain the active material molded body 2. Specifically, a baking temperature is preferably set to a temperature range of 300° C. to 800° C. According to this, the first inorganic solid electrolyte is generated from the precursor through the baking, and thus the first solid electrolyte layer 3 is formed.

When the baking is performed in the above-described temperature range, at an interface between the active material molded body 2 and the first solid electrolyte layer 3, it is possible to prevent a solid phase reaction from occurring due to mutual diffusion of elements which respectively constitute the active material molded body 2 and the first solid electrolyte layer 3, and it is possible to suppress generation of a by-product that is electrochemically inactive. In addition, crystallinity of the first inorganic solid electrolyte is improved, and thus it is possible to improve ion conductivity of the first solid electrolyte layer 3. In addition, sintering of a portion occurs at the interface between the active material molded body 2 and the first solid electrolyte layer 3, and thus charge migration at the interface becomes easy. According to this, the capacity or the output of the lithium battery that uses the electrode composite body 4 is improved.

In addition, the baking may be performed through one heat treatment, or may be performed by dividing the heat treatment into a first heat treatment in which the precursor is deposited on the surface of the porous body, and a second heat treatment in which heating is performed under a temperature condition that is equal to or higher than a treatment temperature in the first heat treatment and equal to or lower than 800° C. When the baking is performed through the heat treatment performed step by step, it is possible to easily form the first solid electrolyte layer 3 at a desired position.

Figure 5A:
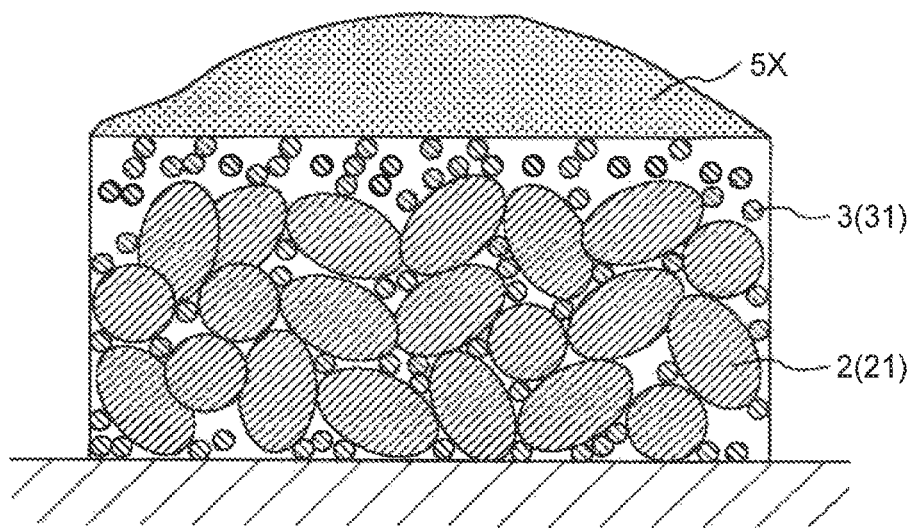
FIGS. 5A and 5B are views illustrating a method of manufacturing the lithium secondary battery illustrated in FIG. 1.
Figure 5B:
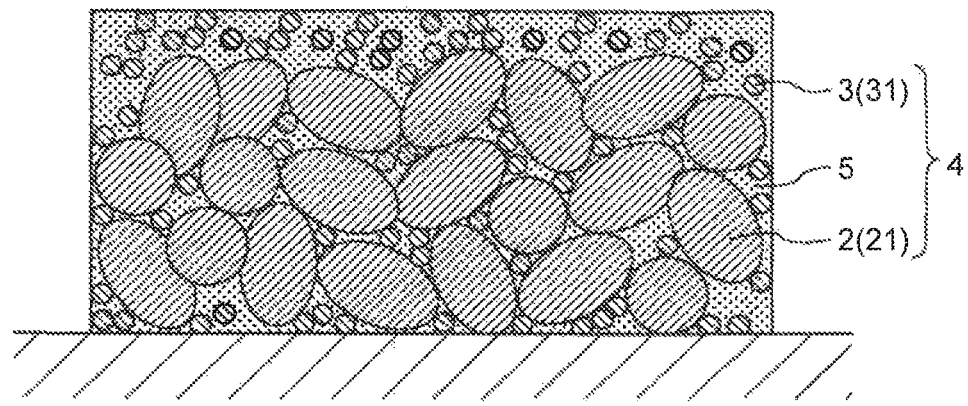

Next, as illustrated in FIG. 5A, a powder 5X (solid material) of the second inorganic solid electrolyte is supplied to the surface of the active material molded body 2 and the first solid electrolyte layer 3.

The powder 5X may be supplied in a state of having flowability as a powder, or may be supplied in a state of being solidified in a sheet shape, a block shape, or the like (for example, a cube sular-like state).

In addition, a position to which the powder 5X is supplied is not particularly limited as long as the powder 5X comes into contact with the active material molded body 2 and the first solid electrolyte layer 3 at the position, and the powder 5X may be supplied to an upper surface, a lateral surface, or the entirety of surfaces.

In addition, although not particularly limited, it is preferable that an average particle size of the powder 5X is 0.5 μm to 500 μm, and more preferably 1 μm to 100 μm. When the average particle size of the powder 5X is set in the above-described range, when heating the powder 5X, it is possible to uniformly melt the entirety of the powder 5X in a short period of time. According to this, it is possible to impregnate the resultant molten material to the every corner inside the pores of the active material molded body 2.

In addition, for example, the average particle size of the powder 5X is obtained as a particle size at 50% from a small diameter side on the basis of the mass in a particle size distribution obtained by a laser diffraction method.

Next, the powder 5X is heated. According to this, the powder 5X is melted, and a molten material of the second inorganic solid electrolyte is generated. The molten material of the second inorganic solid electrolyte is impregnated into the pores of the active material molded body 2, that is, the voids which are not buried with the first solid electrolyte layer 3. That is, the molten material of the second inorganic solid electrolyte is in a liquid state, and has excellent flowability that is specific to a liquid. According to this, it is also possible to efficiently impregnate the molten material into narrow voids. In addition, as described later, the molten material, which is impregnated into the voids, is solidified, and thus the second solid electrolyte layer 5, which fills the pores of the active material molded body 2 at a relatively high filling factor, is obtained. As a result, it is possible to attain high capacity and high output of the lithium secondary battery 100.

In addition, in the method, since the molten material of the powder 5X is impregnated, it is possible to minimize a decrease in volume during solidification, for example, in comparison to a method of impregnating a dispersed solution obtained by dispersing the powder 5X in a dispersing medium and the like. In other words, a material such as the dispersing medium to be removed is not included, and thus a decrease in volume during solidification is suppressed. According to this, the second solid electrolyte layer 5 can more closely fill the pores of the active material molded body 2, and can contribute to realization of a more stable charge and discharge cycle.

A heating temperature for the powder 5X may be equal to or higher than the melting point of the second inorganic solid electrolyte, and is preferably lower than 800° C. According to this, it is possible to prevent mutual diffusion from occurring between the first solid electrolyte layer 3 and the second solid electrolyte layer 5. As a result, it is possible to suppress deterioration of characteristics of the first solid electrolyte layer 3 and the second solid electrolyte layer 5. In addition, as an example, the heating temperature for the powder 5X may be 650° C. to 750° C.

In addition, a heating time for the powder 5X is not particularly limited as long as the entirety of powder 5X can be melted, and as an example, the heating time is 1 minute to 2 hours, and preferably 3 minutes to 1 hour.

Next, the molten material of the powder 5X is solidified. According to this, the molten material becomes a solid and is crystallized at the inside of the pores of the active material molded body 2. As a result, the second solid electrolyte layer 5, which is crystalline, is formed (refer to FIG. 5B).

The solidification of the molten material may be performed by a method in which the molten material is left as is (natural heat radiation), or a method of compulsorily radiating heat of the molten material. However, when cooling is performed quickly, there is a concern that a great thermal shock may be applied depending on a cooling rate, and thus it is preferable that the molten material is solidified through slow cooling.

In addition, a grain size of crystals included in the second solid electrolyte layer 5 that is formed can be made to be relatively smaller by setting a heat radiation rate to be fast, and the grain size of crystals, which are formed, can be made to be relatively larger by setting the heat radiation rate to be slow. Accordingly, it is possible to adjust the grain size of the crystals which are included in the second solid electrolyte layer 5 by appropriately changing the heat radiation rate.

As described above, the electrode composite body 4 including the active material molded body 2, the first solid electrolyte layer 3, and the second solid electrolyte layer 5 is obtained.

Figure 6A:
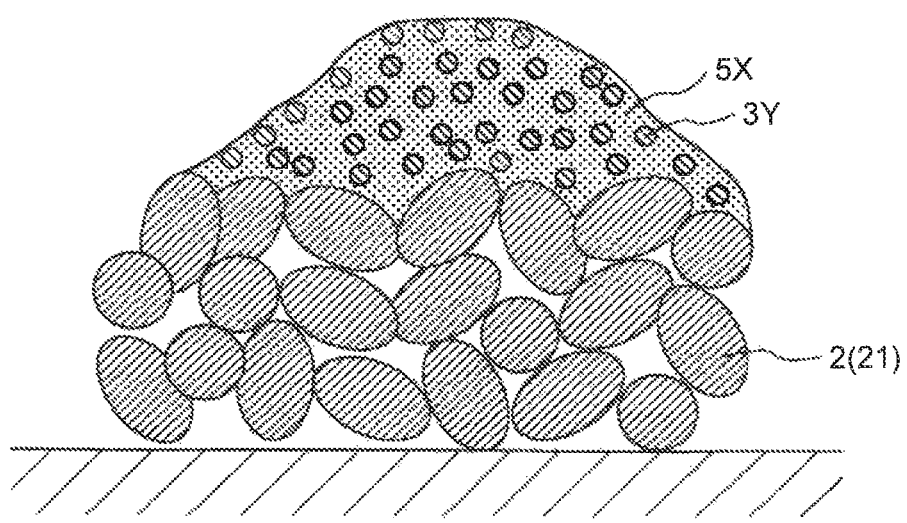
FIGS. 6A and 6B are views illustrating a method of manufacturing the lithium secondary battery illustrated in FIG. 1.
Figure 6B:
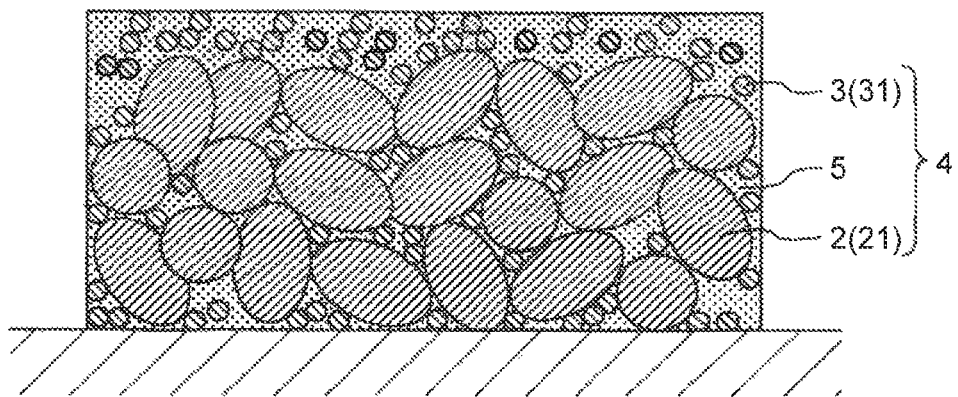

[2-2] FIGS. 6A and 6B are views illustrating a second method of manufacturing the electrode composite body 4. In addition, hereinafter, description will be mainly given of a difference from the first method, and description of the same configuration will not be repeated.

In the second method, first, as illustrated in FIG. 6A, a powder 3Y (solid material) of the first inorganic solid electrolyte, and a powder 5X (solid material) of the second inorganic solid electrolyte are supplied to the surface of the active material molded body 2.

The powder 3Y and the powder 5X may be respectively supplied in a state of having flowability as a powder, or may be respectively supplied in a state of being solidified in a sheet shape, a block shape, or the like.

In addition, a position to which the powder 3Y and the powder 5X are supplied is not particularly limited as long as the powder 3Y and the powder 5X come into contact with the active material molded body 2 at the position, and the powder 3Y and the powder 5X may be supplied to an upper surface, a lateral surface, or the entirety of surfaces.

Next, the powder 5X is heated. According to this, the powder 5X is melted, and a molten material of the second inorganic solid electrolyte is generated. The molten material of the second inorganic solid electrolyte is impregnated into the pores of the active material molded body 2. That is, the molten material of the second inorganic solid electrolyte is in a liquid state, and has excellent flowability that is specific to a liquid. According to this, it is also possible to efficiently impregnate the molten material into narrow pores. In addition, as described later, the molten material, which is impregnated into the pores, is solidified, and thus the second solid electrolyte layer 5, which fills the pores of the active material molded body 2 at a relatively high filling factor, is obtained.

On the other hand, in the second method, as the second inorganic solid electrolyte, an electrolyte having the melting point lower than that of the first inorganic solid electrolyte is selected. Since the second inorganic solid electrolyte is selected, when heating and melting the powder 5X, it is possible to prevent the powder 3Y from being melted by appropriately setting a heating temperature.

Accordingly, a heating temperature for the powder 5X is set to be equal to or higher than the melting point of the second inorganic solid electrolyte, and is lower than the melting point of the first inorganic solid electrolyte.

In addition, as described above, the second inorganic solid electrolyte is an inorganic solid electrolyte that contains boron as a constituent element. Although slightly different depending on the entire composition, when containing boron as a constituent element, the melting point of the solid electrolyte can be lowered. Accordingly, in this embodiment, since the boron-containing electrolyte is used as the second inorganic solid electrolyte, it is easy to make the melting point of the second inorganic solid electrolyte to be lower than the melting point of the first inorganic solid electrolyte. In other words, since the boron-containing electrolyte is used, it is possible to realize the second inorganic solid electrolyte having the melting point lower than that of the first inorganic solid electrolyte without making a sacrifice of characteristics of the solid electrolyte such as lithium ion conductivity and insulating properties, and thus it is possible to enhance a filling factor with an electrolyte while maintaining charge mobility in the electrode composite body 4.

In addition, in this method, the molten material of the powder 5X is impregnated, and thus it is possible to minimize a decrease in volume during solidification, for example, in comparison to a method of impregnating a dispersed solution obtained by dispersing the powder 5X in a dispersing medium and the like. In other words, a material such as the dispersing medium to be removed is not included, and thus a decrease in volume during solidification is suppressed. According to this, the second solid electrolyte layer 5 can more closely fill the pores of the active material molded body 2, and can contribute to realization of a more stable charge and discharge cycle.

In addition, the powder 3Y and the powder 5X are supplied to the same position, and thus the powder 3Y is trapped by the powder 5X that is melted. According to this, a liquid molten material, in which the powder 3Y is dispersed, is obtained. The molten material, which includes the powder 3Y as described above, is in a liquid state as a whole while maintaining characteristics as a powder by the powder 3Y.

Accordingly, when melting the powder 5X, a molten material of the powder 5X can be allowed to enter the pores of the active material molded body 2 while being accompanied with the powder 3Y. According to this, it is possible to transfer the powder 3Y into the pores of the active material molded body 2 by using flowability of the molten material of the powder 5X as a driving force.

Accordingly, finally, it is possible to fill the pores of the active material molded body 2 with the first solid electrolyte layer 3 and the second solid electrolyte layer 5 at a high filling factor. As a result, it is possible to attain high capacity and high output of the lithium secondary battery 100.

In addition, although not particularly limited, an average particle size of the powder 3Y is preferably 0.5 μm to 500 μm, and more preferably 1 μm to 100 μm. When the average particle size of the powder 3Y is set in the range, it is possible to efficiently allow the powder 3Y to penetrate into the pores of the active material molded body 2. According to this, it is possible to impregnate the powder 3Y to the every corner inside the active material molded body 2.

In addition, for example, the average particle size of the powder 3Y is obtained as a particle size at 50% from a small diameter side on the basis of the mass in a particle size distribution obtained by a laser diffraction method.

Next, the molten material of the powder 5X is solidified. According to this, the molten material becomes a solid and is crystallized. As a result, the second solid electrolyte layer 5, which is crystalline, is formed (refer to FIG. 6B).

The solidification of the molten material may be performed by a method in which the molten material is left as is (natural heat radiation), or a method of compulsorily radiating heat of the molten material.

A grain size of crystals included in the second solid electrolyte layer 5 that is formed can be made to be relatively smaller by setting a heat radiation rate to be fast, and the grain size of crystals, which are formed, can be made to be relatively larger by setting the heat radiation rate to be slow. Accordingly, it is possible to adjust the grain size of the crystals which are included in the second solid electrolyte layer 5 by appropriately changing the heat radiation rate.

In addition, at least a part of the powder 3Y aggregates to generate the granular bodies 31. According to this, the first solid electrolyte layer 3 is formed.

As described above, the electrode composite body 4 including the active material molded body 2, the first solid electrolyte layer 3, and the second solid electrolyte layer 5 is obtained.

[2-3] In addition, although not illustrated, description will be given of a third method of manufacturing the electrode composite body 4.

In the third method, for example, LLZNb is generated in a LCBO flux. In addition, the active material molded body 2 is impregnated with the resultant solution that is obtained.

Then, the solution is dried, and thus the first solid electrolyte layer 3 and the second solid electrolyte layer 5 are formed, thereby obtaining the electrode composite body 4.

[3] Then, the electrode composite body 4 may be compressed to be molded again as necessary.

Figure 7A:
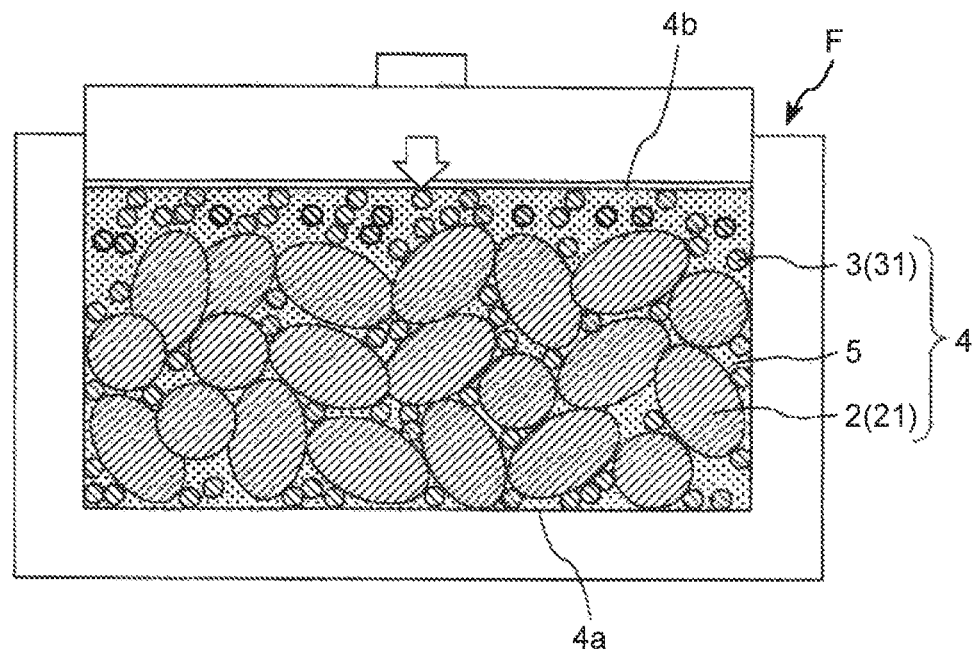
FIGS. 7A and 7B are views illustrating a method of manufacturing the lithium secondary battery illustrated in FIG. 1.

Examples of a method of compressing the electrode composite body 4 include a method in which the electrode composite body 4 is accommodated in a space provided to a mold F that is used in the above-described process, and in this state, the volume of the space is shrunk as illustrated in FIG. 7A.

Here, as described above, the active material molded body 2 includes voids, but the voids are filled with the first solid electrolyte layer 3 and the second solid electrolyte layer 5. However, there is a possibility that voids, which are not filled, may partially exist. In these voids, for example, the granular bodies 31 come into contact with each other in a point contact manner, and the active material particles 21 and the granular bodies 31 also come into contact with each other in a point contact manner. There is a concern that the above-described point contact may cause a decrease in lithium ion conductivity at a point contact portion, and thus high output of the lithium secondary battery 100 may deteriorate.

Accordingly, the electrode composite body 4 is compressed to be molded again, thereby shrinking voids which remain inside the electrode composite body 4. In addition, typically, the granular bodies 31 are harder than the active material particles 21, and thus when compressing the electrode composite body 4, the active material particles 21 slide against each other, and thus the electrode composite body 4 is molded again. According to this, the voids are shrunk, and the granular bodies 31 with a void interposed therebetween come into contact with each other, or the active material particles 21 and the granular bodies 31 with a void interposed therebetween come into contact with each other. In addition, a portion in which the contact occurs already contributes to an increase in a contact area. As a result, the lithium ion conductivity between the active material particles 21 and the granular bodies 31, and between the granular bodies 31 becomes excellent, and thus additional high output of the lithium secondary battery 100 is attained.

A pressure for compressing the electrode composite body 4 is preferably 10 N/mm$^2$ to 1000 N/mm$^2$, more preferably 50 N/mm$^2$ to 500 N/mm$^2$, and still more preferably 100 N/mm$^2$ to 400 N/mm$^2$. When the pressure is lower than the lower limit, there is a concern that shrinkage of the voids may be difficult. In addition, when the pressure is higher than the upper limit, there is a concern that the electrode composite body 4 may be broken.

In addition, the time taken for compression of the electrode composite body 4 is preferably 1 second to 600 seconds, more preferably 30 seconds to 600 seconds, and still more preferably 30 seconds to 180 seconds. In a case where the time taken for the compression of the electrode composite body 4 is shorter than the lower limit, it is difficult to uniformly compress the electrode composite body 4, and there is a concern that it is difficult to enlarge a contact area between the granular bodies 31 over the entirety of the electrode composite body 4. In addition, the time taken for the compression is longer than the upper limit time, which is necessary for this process, is unnecessarily lengthened, and thus there is a concern that a decrease in manufacturing efficiency may be caused.

In addition, it is preferable to heat the electrode composite body 4 during compression of the electrode composite body 4. According to this, a connection force, which connects the active material particles 21 which form the active material molded body 2, is reduced. Accordingly, it is possible to allow the active material particles 21 to reliably slide against each other, and thus it is possible to reliably shrink voids which remain in the electrode composite body 4.

A temperature of heating the electrode composite body 4 is preferably lower than a temperature during the heat treatment for obtaining the active material molded body 2 under the atmospheric atmosphere. Specifically, the temperature is more preferably in a range of 300° C. to 700° C. According to this, at an interface between the active material molded body 2 and the first solid electrolyte layer 3, an interface between the first solid electrolyte layer 3 and the second solid electrolyte layer 5, and an interface between the active material molded body 2 and the second solid electrolyte layer 5, it is possible to suppress generation of a by-product, which is electrochemically inactive, due to the occurrence of a solid phase reaction by mutual diffusion of elements which respectively constitute the active material molded body 2, the first solid electrolyte layer 3, and the second solid electrolyte layer 5.

In addition, in a case of performing the heat treatments in (B) and (C), it is preferable that the heat treatment time in each of the heat treatments is set to 5 minutes to 36 hours, and more preferably 4 hours to 14 hours.

In addition, I) the heating of the electrode composite body 4 may be performed simultaneously with the compression of the electrode composite body 4, II) the heating may be performed prior to the compression of the electrode composite body 4, or III) the heating may be performed after the compression of the electrode composite body 4. In addition, I), II), and III) may be performed in combination, and a combination of I) and II) is more preferable. According to this, it is possible to allow the active material particles 21 to reliably slide against each other without generating a crack and the like at a connection portion at which the active material particles 21 are connected to each other, and thus it is possible to shrink voids which remain in the electrode composite body 4.

In addition, in a case of a combination of I) to III), when heating temperatures at I), II), and III) are set to I [° C.], II [° C.], and III [° C.], respectively, it is preferable to satisfy a relationship of I≥II>III. According to this, it is possible to allow the active material particles 21 to reliably slide against each other without generating a crack and the like at a connection portion at which the active material particles 21 are connected to each other, and thus it is possible to shrink voids which remain in the electrode composite body 4. In addition, it is possible to reliably connect the active material particles 21 which are allowed to slide against each other. That is, an improvement in the strength of the active material molded body 2 that is molded again is attained.

Figure 7B:
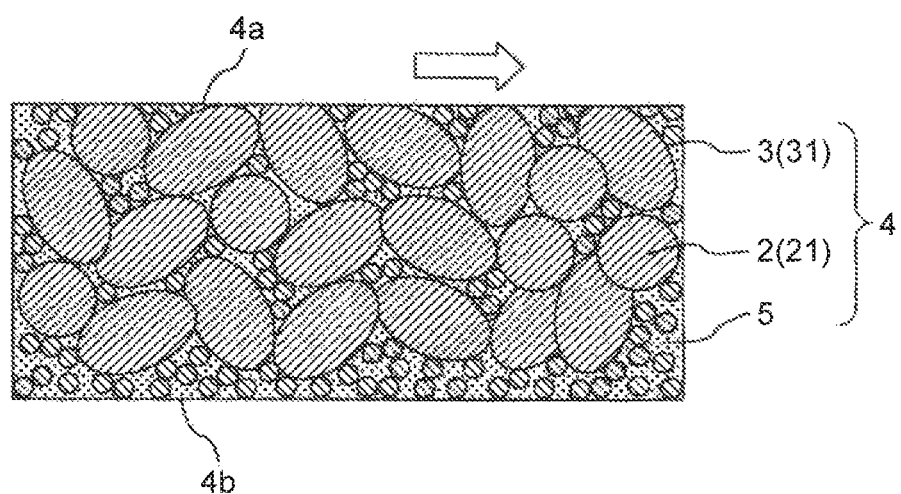

[4] Next, the one surface 4a of the electrode composite body 4 is ground and polished to expose the active material molded body 2, the first solid electrolyte layer 3, and the second solid electrolyte layer 5 from the one surface 4a (refer to FIG. 7B).

In this case, scratches (grinding and polishing scratches) which are traces of the grinding and polishing remain on the one surface 4a.

In addition, in the process, when forming the electrode composite body 4, the active material molded body 2, the first solid electrolyte layer 3, and the second solid electrolyte layer 5 are exposed from the one surface 4a. In this case, the grinding and polishing with respect to the one surface 4a of the electrode composite body 4 may be omitted, that is, this process may be omitted.

In addition, this process may be performed prior to the compression of the electrode composite body 4.

Figure 8A:
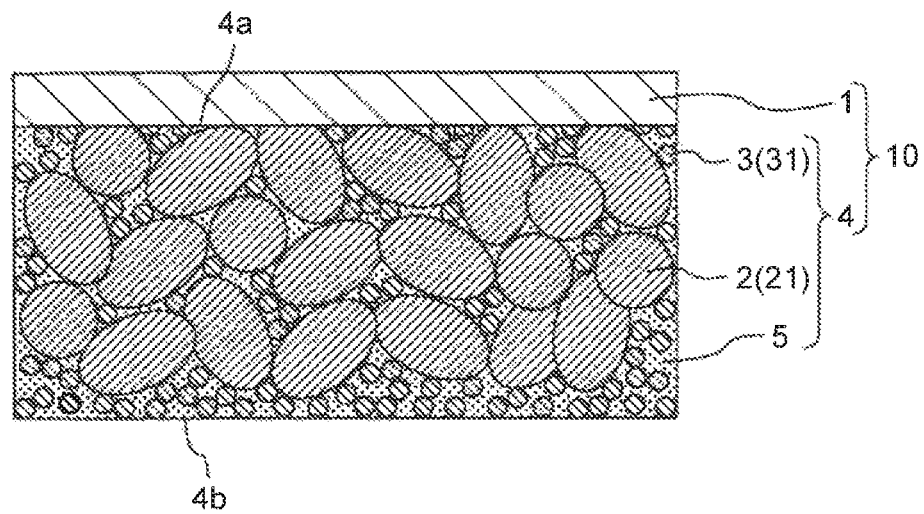
FIGS. 8A and 8B are views illustrating a method of manufacturing the lithium secondary battery illustrated in FIG. 1.

[5] Next, as illustrated in FIG. 8A, the current collector 1 is joined to the one surface 4a of the electrode composite body 4.

According to this, the stacked body 10 including the active material molded body 2, the first solid electrolyte layer 3, the second solid electrolyte layer 5, and the current collector 1 is formed.

The joining of the current collector 1 may be performed by joining the current collector 1, which is formed as a separate member, to the one surface 4a of the electrode composite body 4, or may be performed by forming a film of a formation material of the current collector 1 to the one surface 4a of the electrode composite body 4 to form the current collector 1 on the one surface 4a of the electrode composite body 4.

As a method of forming the current collector 1, various physical vapor deposition (PVD) methods and chemical vapor deposition (CVD) methods can be used.

In this manner, the electrode composite body 4 and the stacked body 10 are obtained. In addition, after the electrode composite body 4 is formed on an arbitrary member and is peeled off, the electrode composite body 4 may be joined to the current collector 1 to manufacture the stacked body 10.

Next, description will be given of a method of manufacturing the lithium secondary battery 100 in which the stacked body 10 including the electrode composite body 4 is used.

[6] Next, the lithium secondary battery 100 is formed by using the stacked body 10.

As described above, the stacked body 10 is a structure capable of being used as one electrode of a battery, and thus it is possible to form the battery by joining the other electrode structure to the electrode composite body 4 that is included in the stacked body 10. After the above-described process, the lithium secondary battery 100 is formed through the following processes.

The other surface 4b can be flat by grinding and polishing the other surface 4b of the electrode composite body 4, and thus it is possible to enhance adhesiveness between the other surface 4b and the electrode 20.

Figure 8B:
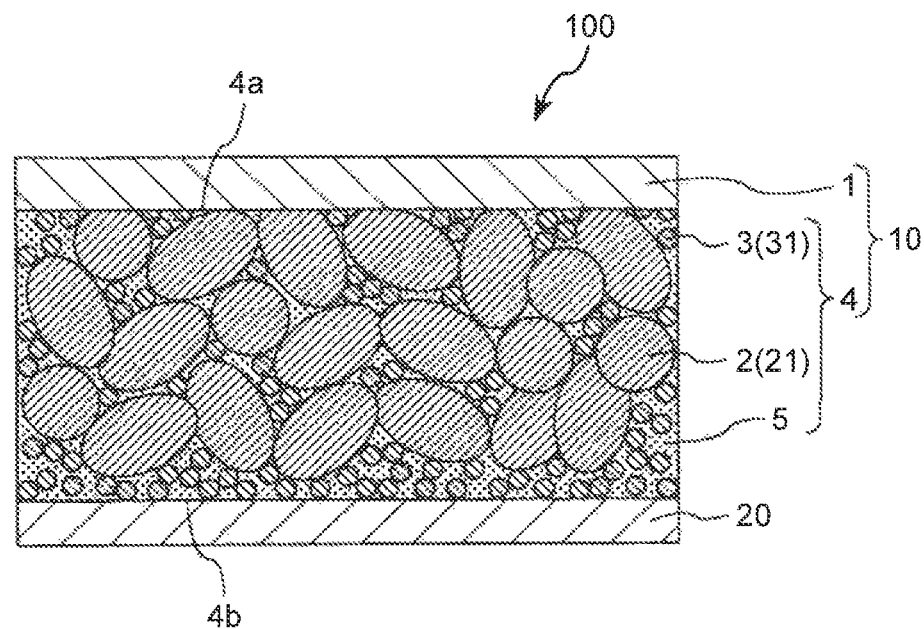

Next, as illustrated in FIG. 8B, an electrode 20, which is the other electrode structure, is joined to the other surface 4b of the electrode composite body 4.

In addition, the joining of the electrode 20 may be performed by joining the electrode 20, which is formed as a separate body, to the other surface 4b of the electrode composite body 4, or by forming a film of a formation material of the electrode 20 on the other surface 4b of the electrode composite body 4 to form the electrode 20 on the other surface 4b of the electrode composite body 4.

In addition, as a film forming method of the electrode 20, the same method as in the film forming method of the current collector 1 can be used.

The lithium secondary battery 100 is manufactured through the above-described processes.

Second Embodiment

In this embodiment, description will be given of a lithium secondary battery having a structure different from that of the first embodiment. In addition, in the following embodiments including this embodiment, the same reference numerals will be given to the same constituent elements as the constituent elements in the first embodiment, and description thereof may not be repeated.

Figure 9:
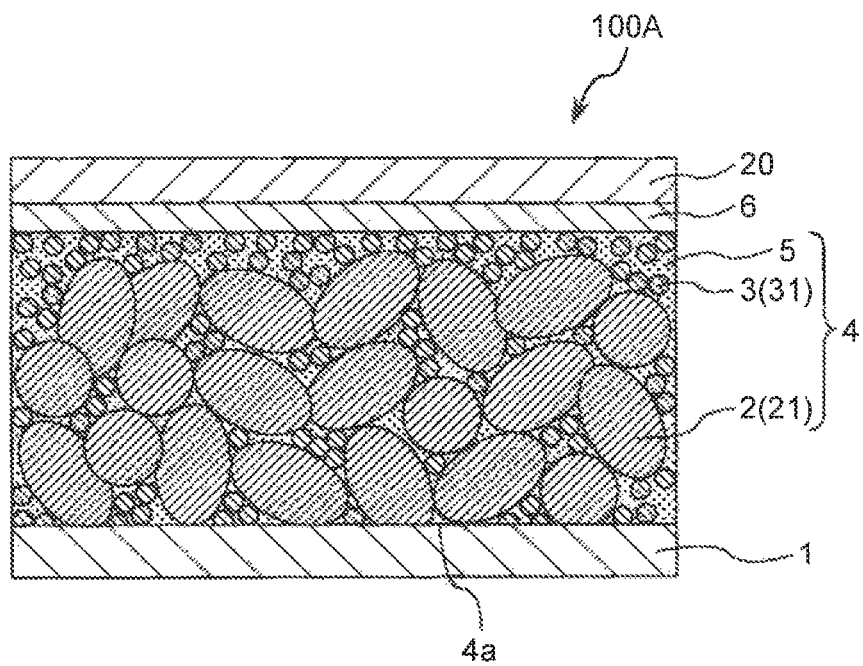
FIG. 9 is a longitudinal cross-sectional view illustrating a second embodiment of a lithium secondary battery that is manufactured by applying the method of manufacturing a lithium battery according to the invention.

FIG. 9 is a longitudinal cross-sectional view of a lithium secondary battery according to a second embodiment.

In a lithium secondary battery 100A, a third solid electrolyte layer 6 is provided between the electrode composite body 4 and the electrode 20.

The third solid electrolyte layer 6, which is constituted by a third inorganic solid electrolyte different from the first inorganic solid electrolyte or the second inorganic solid electrolyte, is provided between the electrode composite body 4 and the electrode 20.

When the third solid electrolyte layer 6 is provided, it is possible to prevent the current collector 1 and the electrode 20 from being short-circuited due to contact between the active material molded body 2 and the electrode 20. Accordingly, even in a case where the active material molded body 2 is exposed from the other surface 4b of the electrode composite body 4, the third solid electrolyte layer 6 functions as a short-circuit prevention layer (insulating layer) capable of preventing short-circuit between the current collector 1 and the electrode 20. Accordingly, it is possible to stabilize the charge and discharge cycle over a longer period of time.

As is the case with the first inorganic solid electrolyte or the second inorganic solid electrolyte, the third inorganic solid electrolyte may be a solid electrolyte capable of conducting lithium ions. In addition, a composition of the third inorganic solid electrolyte may be the same as or different from the composition of the first inorganic solid electrolyte or the composition of the second inorganic solid electrolyte.

In addition, it is preferable that the third inorganic solid electrolyte is an inorganic solid electrolyte (boron-containing electrolyte) such as $Li_2B_2O_4$ and $Li_3BO_3$ which contain boron as a constituent element. The third inorganic solid electrolyte is less likely to be affected by moisture, and thus it is possible to further enhance the long-term stability of the third solid electrolyte layer 6. As a result, the lithium secondary battery 100, which is obtained, has higher reliability.

In addition, the third inorganic solid electrolyte is less likely to be reduced with a potential of a negative electrode, and thus it is possible to suppress reduction of the first solid electrolyte layer 3 or the second solid electrolyte layer 5. According to this, deterioration of the first solid electrolyte layer 3 or the second solid electrolyte layer 5 is suppressed, and thus it is possible to suppress a decrease in charge and discharge efficiency of the lithium secondary battery 100.

In addition, the third solid electrolyte layer 6 may be formed by any method, and examples of the method include a vapor phase film formation method such as a sputtering method and a vacuum deposition method, a liquid phase film formation method such as an application method and a spraying method, and the like. Among the methods, according to the vapor phase film formation method, it is possible to form the third solid electrolyte layer 6 that is denser in comparison to an electrolyte layer formed by other methods.

According to this, the above-described effect, which is exhibited by the third solid electrolyte layer 6, becomes more significant.

In addition, the third inorganic solid electrolyte may be crystalline or amorphous, but it is preferable that the third inorganic solid electrolyte is amorphous. The third inorganic solid electrolyte, which is amorphous, hardly includes a grain boundary, and thus structure uniformity is high. According to this, for example, even in a case where expansion and contraction of the third solid electrolyte layer 6 repetitively occurs in accordance with charge and discharge of the lithium secondary battery 100 or a variation in temperature, or even in a case where the third solid electrolyte layer 6 receives a stress in accordance with the expansion and contraction of the first solid electrolyte layer 3 or the second solid electrolyte layer 5, the third solid electrolyte layer 6 is less likely to mechanically deteriorate. Accordingly, it is possible to further enhance the long-term stability of the third solid electrolyte layer 6.

In addition, the third inorganic solid electrolyte, which is amorphous, is useful when considering that a decrease in lithium ion conductivity along with a grain boundary is less likely to occur. That is, it is possible to further enhance the reliability without making a sacrifice of the capacity or output of the lithium secondary battery 100.

In addition, according to the vapor phase film formation method, it is easy to densely form a film of the third inorganic solid electrolyte with high degree of amorphousness, and thus the vapor phase film formation method is useful as a method of forming the third solid electrolyte layer 6.

In addition, in a case of using $Li_{2.2}C_{0.8}B_{0.2}O_3$ and $Li_2B_2O_4$ as the second inorganic solid electrolyte and the third inorganic solid electrolyte, respectively, the above-described effect becomes more significant.

Although not particularly limited, for example, an average thickness of the third solid electrolyte layer 6 is preferably 1 µm to 10 µm, and more preferably 2 µm to 5 µm. When the thickness is set, the third solid electrolyte layer 6, which has characteristics of both lithium ion conductivity and lithium reduction resistance, is obtained.

According to the lithium secondary battery 100A of the second embodiment, the same effect as in the first embodiment is obtained.

Third Embodiment

In this embodiment, description will be given of a lithium secondary battery having a structure different from that of the first embodiment and the second embodiment.

Figure 10:
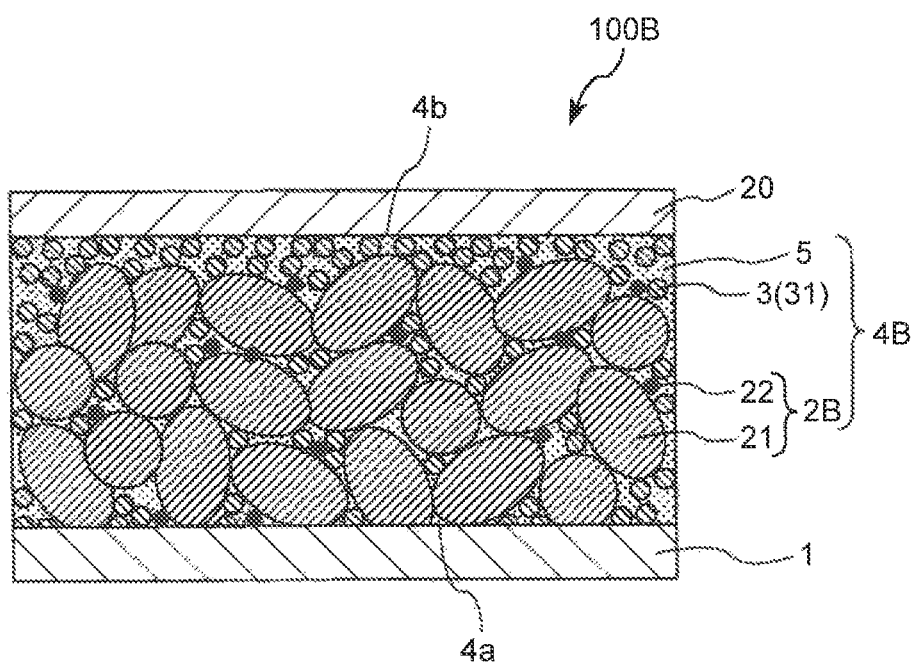
FIG. 10 is a longitudinal cross-sectional view illustrating a third embodiment of a lithium secondary battery that is manufactured by applying the method of manufacturing a lithium battery according to the invention.

FIG. 10 is a longitudinal cross-sectional view of a lithium secondary battery according to a third embodiment.

In a lithium secondary battery 100B, an electrode composite body 4B having a configuration different from that of the electrode composite body 4 is provided between the current collector 1 and the electrode 20 to come into contact with the current collector 1 and the electrode 20.

The electrode composite body 4B includes an active material molded body 2B including the active material particles 21 and noble metal particles 22, the first solid electrolyte layer 3, and the second solid electrolyte layer 5.

In other words, the electrode composite body 4B includes the active material molded body 2B, which includes the active material particles 21 and the noble metal particles 22 which include a noble metal having a melting point of 1000° C. or higher and have a particle shape, instead of the active material molded body 2 that is provided to the electrode composite body 4 in the first embodiment.

The noble metal particles 22 have a particle shape, and adhere to the surface of the plurality of active material particles 21 which are connected to each other, or are interposed between the active material particles 21.

According to this, delivery of electrons between the plurality of active material particles 21, and delivery of lithium ions between the active material particles 21, and the first solid electrolyte layer 3 and the second solid electrolyte layer 5 are performed through the noble metal particles 22, and thus the delivery of the electrons and the delivery of the lithium ions can be smoothly performed. In addition, the delivery of electrons between the plurality of active material particles 21, and the delivery of lithium ions between the active material particles 21, and the first solid electrolyte layer 3 and the second solid electrolyte layer 5 are performed stably maintained over a long period of time. According to this, when the electrode composite body 4B having this configuration is applied to the lithium secondary battery 100B, the lithium secondary battery 100B can stably maintain high output and high capacity over a long period of time. It is preferable that the noble metal particles 22 contain a noble metal having a melting point of 1000° C. or higher as a formation material (constituent material).

Although not particularly limited, examples of the noble metal having a melting point of 1000° C. or higher include gold (Au; melting point: 1061° C.), platinum (Pt; melting point: 1768° C.), palladium (Pd; melting point: 1554° C.), rhodium (Rh; melting point: 1964° C.), iridium (Ir; melting point: 2466° C.), and ruthenium (Ru; melting point: 2334° C.), and osmium (Os; melting point: 3033° C.). These metals may be used alone or an alloy of these metals may be used. Among these, at least one kind of platinum and palladium is preferable. Among noble metals, the above-described noble metals can be easily treated at a relatively low price, and are excellent in conductivity of lithium ions and electrons. According to this, when the noble metals are used as a constituent material of the noble metal particles 22, the delivery of electrons between the plurality of active material particles 21, and the delivery of lithium ions between the active material particles 21, and the first solid electrolyte layer 3 and the second solid electrolyte layer 5 can be smoothly performed, and can be stably maintained over a long period of time.

In addition, it is preferable that an average particle size of the noble metal particles 22 is 0.1 µm to 10 µm, and more preferably 0.1 µm to 5 µm. In addition, the average particle size of the noble metal particles 22 can be measured by using the same method as in the measurement of the average particle size of the active material particles 21.

In addition, it is preferable that the content rate of the noble metal particles 22 in the active material molded body 2B is 0.1% by mass to 10% by mass, and more preferably 1% by mass to 10% by mass.

When the average particle size and the content rate of the noble metal particles 22 are set in the above-described ranges, it is possible to allow the noble metal particles 22 to adhere to the surface of the active material particles 21 in a more reliable manner, or it is possible to allow the noble metal particles 22 to be interposed between the active material particles 21. As a result, the delivery of electrons between the plurality of active material particles 21, and the delivery of lithium ions between the active material particles 21, and the first solid electrolyte layer 3 and the second solid electrolyte layer 5 can be smoothly performed, and can be stably maintained over a long period of time.

For example, the active material molded body 2B can be manufactured by adding the noble metal particles 22 in combination with the active material particles 21 in the above-described method of manufacturing the lithium secondary battery.

According to the lithium secondary battery 100B of the third embodiment, it is possible to obtain the same effect as in the first embodiment.

Hereinbefore, description has been given on the basis of the embodiments in which the electrode composite body, the method of manufacturing the electrode composite body, and the lithium battery according to the invention are described, but the invention is not limited thereto.

For example, an arbitrary configuration may be added to the electrode composite body according to the invention and the lithium battery according to the invention.

In addition, one or more arbitrary processes may be added to the method of manufacturing the electrode composite body according to the invention.

In addition, the lithium battery according to the invention may have a configuration in which two or more configurations of the lithium batteries of the respective embodiments are combined in an arbitrary manner.

In addition, application according to the invention can be made in various manners in a range not departing from the gist of the invention.

EXAMPLES

Next, description will be given of specific examples of the invention.

1. Manufacturing of Lithium Secondary Battery

Example 1

<1> First, 100 parts by mass of powder-shaped $LiCoO_2$ (manufactured by Sigma-Aldrich Co. LLC.) (hereinafter, many be referred to as "LCO"), and 3 parts by mass of polyacrylic acid (PAA) (manufactured by Sigma-Aldrich Co. LLC.) as a powder-shaped pore forming material were mixed with each other while being crushed by using a mortar.

<2> Next, 80 mg of the resultant mixed powder was put into a dice having a diameter of 11 mmϕ and was compressed to mold a disc-shaped pallet. The molded pallet was sintered by performing a heat treatment in an alumina crucible in which the LCO powder was placed on the bottom at 1000° C. for 8 hours. During the heat treatment, a temperature raising rate was set to 3° C./minute, and a temperature lowering rate was set to 3° C./minute up to 500° C. to prepare a porous active material molded body. The thickness of the active material molded body that was obtained was approximately 300 μm.

<3> Next, a propionic acid solution of lithium acetate, a propionic acid solution of lanthanum acetate 1.5 hydrates, zirconium butoxide, and 2-butoxy ethanol solution of niobium penta ethoxide were stirred while being heated at 90° C. for 30 minutes. Then, the resultant mixture was slowly cooled down to room temperature to obtain a precursor solution of $Li_{6.8}La_3Zr_{1.8}Nb_{0.2}O_{12}$ (hereinafter, referred to as LLZNb). In addition, during preparation of the precursor solution, raw materials were weighed so that atoms of respective elements were contained in a compositional ratio in accordance with a compositional formula of LLZNb.

<4> Next, the precursor solution was impregnated to the active material molded body that was obtained in the process <2>, and drying was performed at 60° C. Then, heating was performed at 200° C. to deposit the precursor of LLZNb onto the active material molded body. The operations from the impregnation of the precursor solution to the active material molded body to heating at 200° C. were repeated before the mass of the precursor that was deposited onto the active material molded body reached 15 mg that was a setting amount.

The precursor in the setting amount was deposited onto the active material molded body, and the entirety thereof was heated at 700° C. and was baked, thereby obtaining a composite body in which the first solid electrolyte layer was formed on the surface of the disc-shaped active material molded body.

<5> Next, 20 mg of $Li_{2.2}C_{0.8}B_{0.2}O_3$ (hereinafter, referred to as "LCBO") powder, which was the second inorganic solid electrolyte prepared by mixing a $Li_2CO_3$ powder and a $Li_3BO_3$ powder in a ratio of 10:2, and by sintering the resultant mixture, was loaded on the surface of the composite body that was obtained.

<6> Next, the composite body, on which the powder was loaded, was heated at 700° C. for 10 minutes. According to this, the powder was melted to impregnate the resultant molten material into the composite body.

<7> Next, the molten material was solidified through natural heat radiation. According to this, the molten material was crystallized to form the second solid electrolyte layer, thereby obtaining the electrode composite body.

<8> Next, mechanical polishing was performed with respect to both opposite surfaces of the electrode composite body that was obtained.

In addition, polishing on a positive electrode side was performed until the active material molded body was exposed from a polished surface in order for the active material molded body and an electrode to come into electrical contact with each other. In addition, on the assumption of a second battery that includes an electrode composite body, polishing was also performed on a negative electrode side in consideration of packaging into a battery case.

<9> Next, an aluminum sheet as a current collector was joined to a positive electrode side. On the other hand, a lithium-resistant layer, lithium metal foil, and copper foil were stacked on a negative electrode side in this order, and these were compressed to form an electrode. According to this, a lithium secondary battery was obtained. In addition, the lithium-resistant layer was formed by a liquid composition composed of polymethyl methacrylate (PMMA) (manufactured by Soken Chemical&Engineering Co., Ltd.), $LiCoO_2$, ethylene carbonate (manufactured by Sigma-Aldrich Co. LLC.), and dimethyl carbonate (Sigma-Aldrich Co. LLC.), and by drying and solidifying the liquid composition.

A lithium secondary battery was obtained through the above described processes.

Example 2

A lithium secondary battery was obtained in the same manner as in Example 1 except that a third solid electrolyte layer constituted by $Li_3BO_3$ (hereinafter, referred to as "LBO"), which is the third inorganic solid electrolyte, was formed instead of the lithium-resistant layer.

In addition, the third solid electrolyte layer was prepared by a sputtering method, and LBO was amorphous.

Example 3

A lithium secondary battery was obtained in the same manner as in Example 2 except that $Li_{6.6}La_3Zr_{1.6}Nb_{0.4}O_{12}$ was used instead of LLZNb.

Example 4

A lithium secondary battery was obtained in the same manner as in Example 2 except that $Li_{6.0}La_3Zr_{1.0}Nb_{1.0}O_{12}$ was used instead of LLZNb.

Example 5

A lithium secondary battery was obtained in the same manner as in Example 2 except that $Li_{2.4}C_{0.6}B_{0.4}O_3$ was used instead of LCBO.

Example 6

A lithium secondary battery was obtained in the same manner as in Example 2 except that $Li_{2.8}C_{0.2}B_{0.8}O_3$ was used instead of LCBO.

Example 7

A lithium secondary battery was obtained in the same manner as in Example 2 except that $Li_{0.35}La_{0.55}TiO_3$ (hereinafter, referred to as "LLT") was used instead of LLZNb that is the first inorganic solid electrolyte.

Example 8

<1> First, an active material molded body was prepared in the same manner as in Example 1.
<2> Next, powder-shaped LLZNb and powder-shaped LCBO were mixed with each other, and the resultant mixed powder was loaded on the surface of the active material molded body.
<3> Next, the active material molded body, on which the mixed powder was loaded, was heated at 700° C. for 10 minutes. According to this, the LCBO powder in the mixed powder was melted, and the molten material was impregnated into the composite body.
<4> Next, the molten material was solidified through natural heat radiation. According to this, the molten material was crystallized to form the second solid electrolyte layer and the first solid electrolyte layer, thereby obtaining an electrode composite body.
<5> Next, polishing was performed in the same manner as in Example 1, and the current collector and the electrode were joined to the electrode composite body, thereby obtaining a lithium secondary battery.

Comparative Example 1

A lithium secondary battery was obtained in the same manner as in Example 1 except that formation of the second solid electrolyte layer was omitted.

Comparative Example 2

A lithium secondary battery was obtained in the same manner as in Example 8 except that formation of the second solid electrolyte layer was omitted.

Reference Example 1

A lithium secondary battery was obtained in the same manner as in Example 1 except that amorphous $Li_2SiO_3$ was used instead of LCBO that is the second inorganic solid electrolyte.

Reference Example 2

A lithium secondary battery was obtained in the same manner as in Example 8 except that amorphous $Li_2SiO_3$ was used instead of LCBO that is the second inorganic solid electrolyte.

2. Evaluation of Lithium Secondary Battery

Evaluation of charge and discharge characteristics was performed with respect to the lithium secondary batteries of respective Examples, respective Comparative Examples and Reference Examples.

The charge and discharge characteristics were measured by using a multi-channel charge and discharge evaluation apparatus (HJ1001SD8, manufactured by Hokuto Denko Corp.). The measurement was performed under conditions of a current density of 0.1 mA/cm, a constant current-constant voltage operation in which a charge upper limit voltage was set to 4.2 V, and a constant current operation in which a discharge lower limit voltage was set to 3.0 V.

As a result, respective Examples exhibited more satisfactory charge and discharge characteristics in comparison to respective Comparative Examples and respective Reference Examples. Particularly, in Examples 1, 2, and 8, the tendency was significant.

The reason for this is considered as follows. That is, the second solid electrolyte layer, which includes the second inorganic solid electrolyte that contains boron as a constituent element and is crystalline, is formed, and thus filling factor of the pores in the active material molded body is improved, and thus an electrical interface increases. As a result, improvement in the charge mobility is attained.

In addition, in respective Examples, it was confirmed that the capacity and output were greater than those in respective Comparative Examples and Reference Examples.

What is claimed is:
1. A method of manufacturing an electrode composite body, comprising:
supplying a solid material of a first inorganic solid electrolyte and a solid material of a second inorganic solid electrolyte, of which a melting point is lower than a melting point of the first inorganic solid electrolyte and which contains boron as a constituent element, to come into contact with an active material molded body including active material particles which include a lithium composite oxide and have a particle shape, and a communication hole that is provided between the active material particles;
melting the solid material of the second inorganic solid electrolyte, and impregnating the resultant molten material of the second inorganic solid electrolyte into the communication hole in combination with the solid material of the first inorganic solid electrolyte; and
solidifying the molten material to be crystallized.
2. The electrode composite body according to claim 1, wherein the lithium composite oxide is $LiCoO_2$.
3. The electrode composite body according to claim 1, wherein the first inorganic solid electrolyte is $Li_{7-x}La_3(Zr_{2-x}, M_x)O_{12}$, where, M represents at least one ele- ment selected from the group consisting of Nb, Sc, Ti, V, Y, Hf, Ta, Al, Si, Ga, Ge, Sn, and Sb, and X represents a real number of 0 to 2.

4. The electrode composite body according to claim 1, wherein the second inorganic solid electrolyte is $Li_{2+x}B_xC_{1-x}O_3$, where X represents a real number that is greater than 0 and less than 1.

5. A method of manufacturing an electrode composite body, comprising:

supplying a solution of a first inorganic solid electrolyte to come into contact with an active material molded body including active material particles which include a lithium composite oxide and have a particle shape, and a communication hole that is provided between the active material particles so as to impregnate the solution into the communication hole;

heating the active material molded body that is impregnated with the solution;

supplying a solid material of a second inorganic solid electrolyte, of which a composition is different from a composition of the first inorganic solid electrolyte and contains boron as a constituent element, to come into contact with the active material molded body;

melting the solid material of the second inorganic solid electrolyte, and impregnating the resultant molten material of the second inorganic solid electrolyte into the communication hole; and solidifying the molten material to be crystallized.

6. The electrode composite body according to claim 5, wherein the lithium composite oxide is $LiCoO_2$.

7. The electrode composite body according to claim 5, wherein the first inorganic solid electrolyte is $Li_{7-x}La_3(Zr_{2-x}, M_x)O_{12}$, where, M represents at least one element selected from the group consisting of Nb, Sc, Ti, V, Y, Hf, Ta, Al, Si, Ga, Ge, Sn, and Sb, and X represents a real number of 0 to 2.

8. The electrode composite body according to claim 5, wherein the second inorganic solid electrolyte is $Li_{2+x}B_xC_{1-x}O_3$, where X represents a real number that is greater than 0 and less than 1.

* * * * *